United States Patent [19]
Mori

[11] Patent Number: 5,175,648
[45] Date of Patent: Dec. 29, 1992

[54] ZOOM LENS

[75] Inventor: Nobuyoshi Mori, Hachioji, Japan

[73] Assignee: Konica Corporation, Tokyo, Japan

[21] Appl. No.: 639,833

[22] Filed: Jan. 10, 1991

[30] Foreign Application Priority Data

Jan. 18, 1990 [JP] Japan ................................. 2-7111
Jan. 18, 1990 [JP] Japan ................................. 2-7112
Apr. 18, 1990 [JP] Japan ............................. 2-100474

[51] Int. Cl.$^5$ ..................... G02B 15/14; G02B 13/18
[52] U.S. Cl. .................................. 359/689; 359/684; 359/708
[58] Field of Search ............... 359/689, 690, 740, 708, 359/684

[56] References Cited

U.S. PATENT DOCUMENTS 4,303,311 12/1981 Nakamura ............................ 359/689
4,854,682 8/1989 Yamanashi .......................... 359/689

FOREIGN PATENT DOCUMENTS 58-75108 5/1983 Japan .
58-50327 11/1983 Japan .
63-271214 11/1988 Japan .
64-72114 3/1989 Japan .

Primary Examiner—Scott J. Sugarman
Attorney, Agent, or Firm—Frishauf, Holtz, Goodman & Woodward

[57] ABSTRACT

A zoom lens comprising a negative first lens unit, a positive second lens unit, and a negative third lens unit and having a small backfocus, in which a refracting power of the third lens unit can be intensified to thereby provide a compact zoom lens. An aberration resulting from intensifying the refracting power is corrected by introducing an aspherical surface into the second lens in particular. Furthermore, the first lens unit is divided into two lens components, and the first lens unit is let out while varying a spacing between the two lens components at the time of focussing whereby focussing can be made with less extension amount from an infinite far point to a near distance while preventing degradation of aberrations.

12 Claims, 30 Drawing Sheets

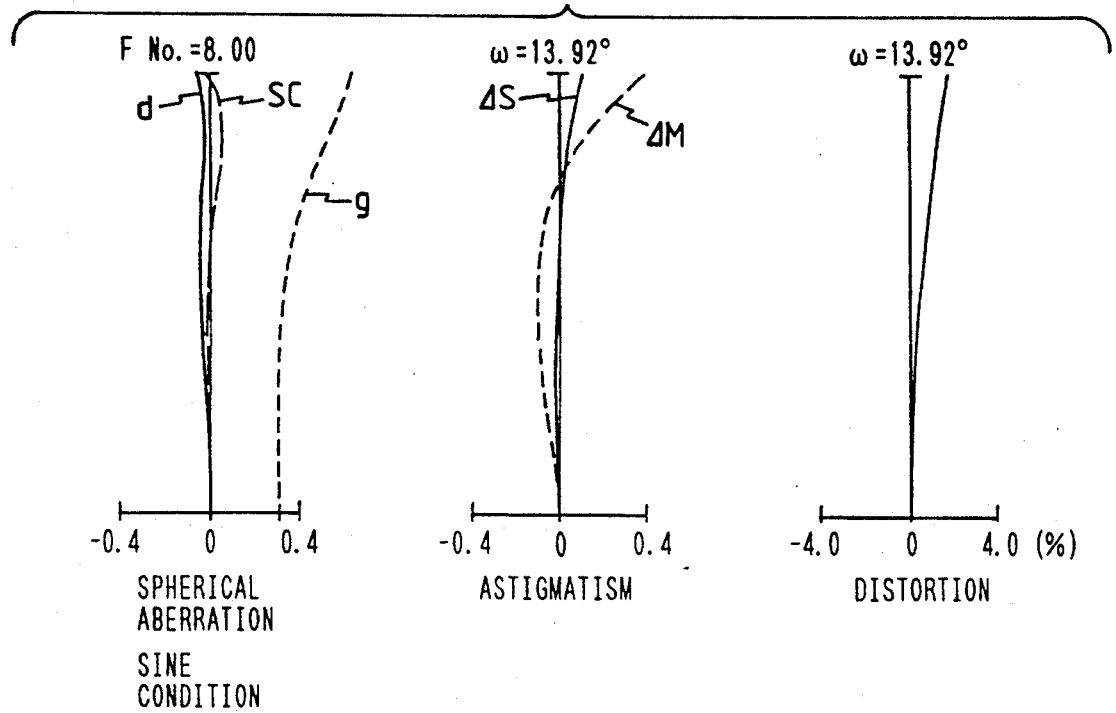
FIG. 18(C)
FIG. 19
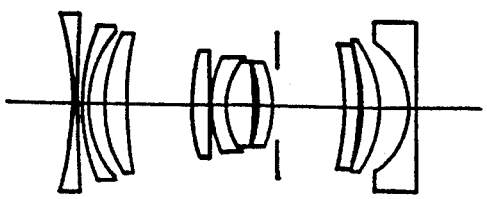

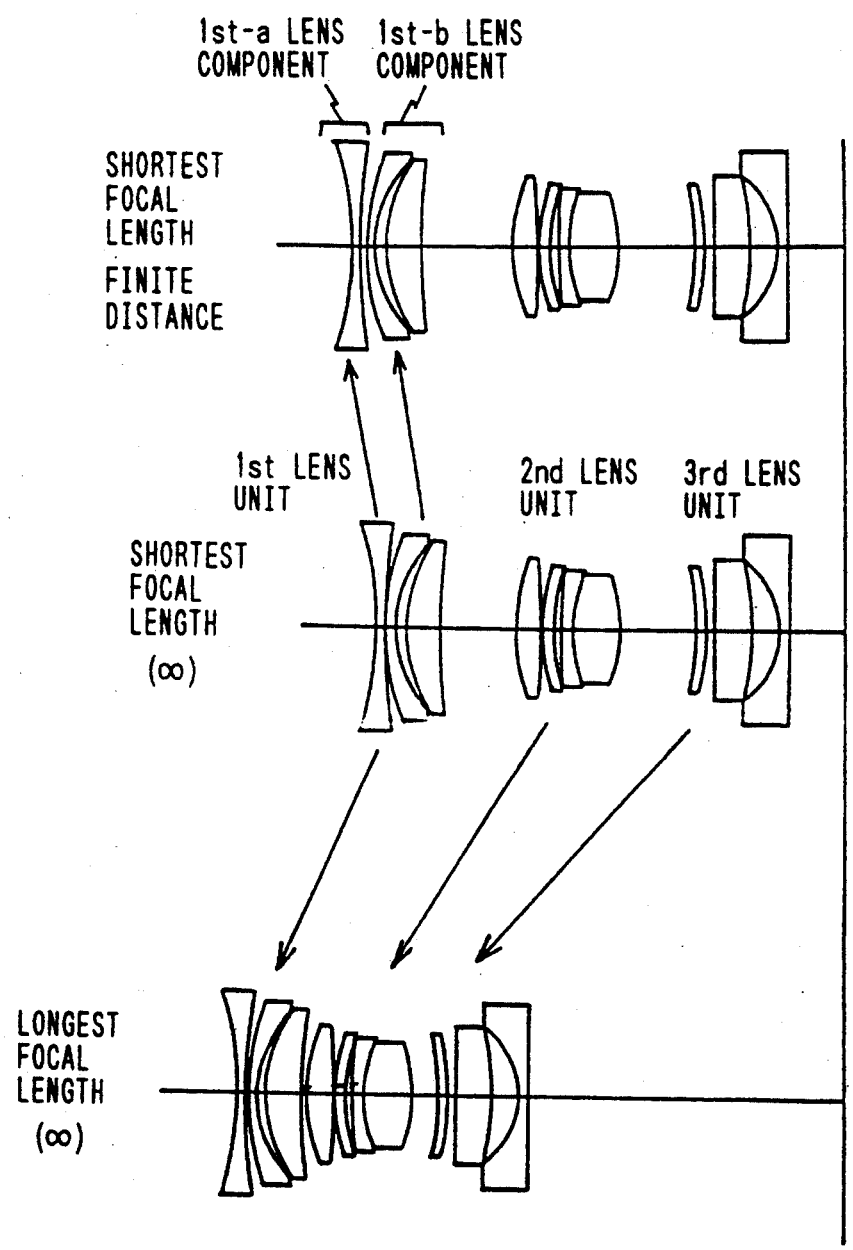

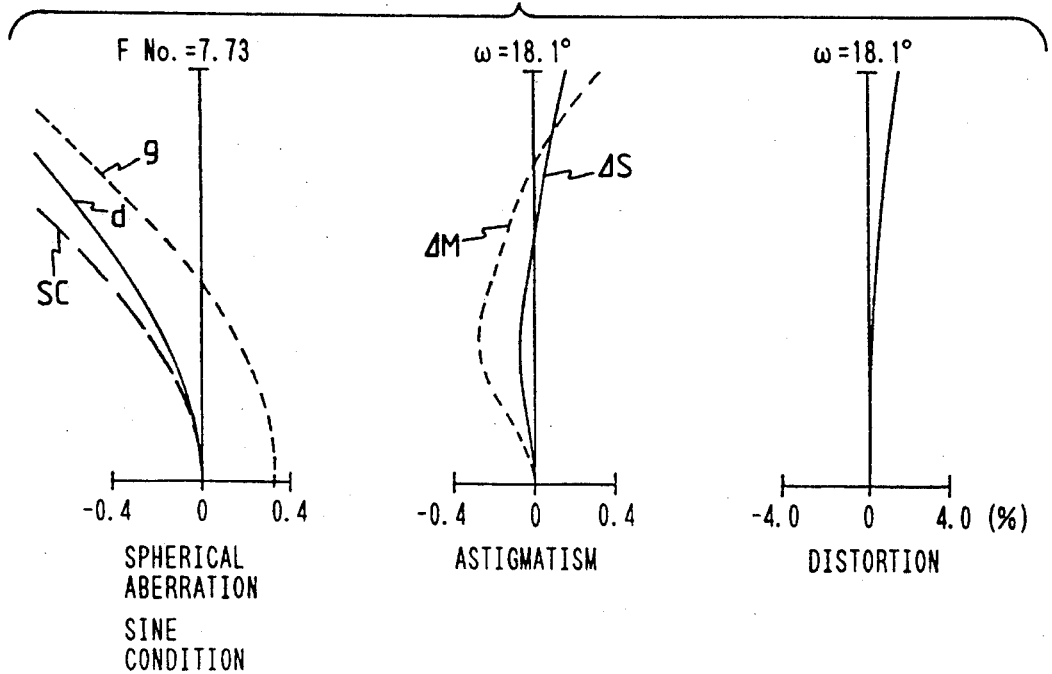
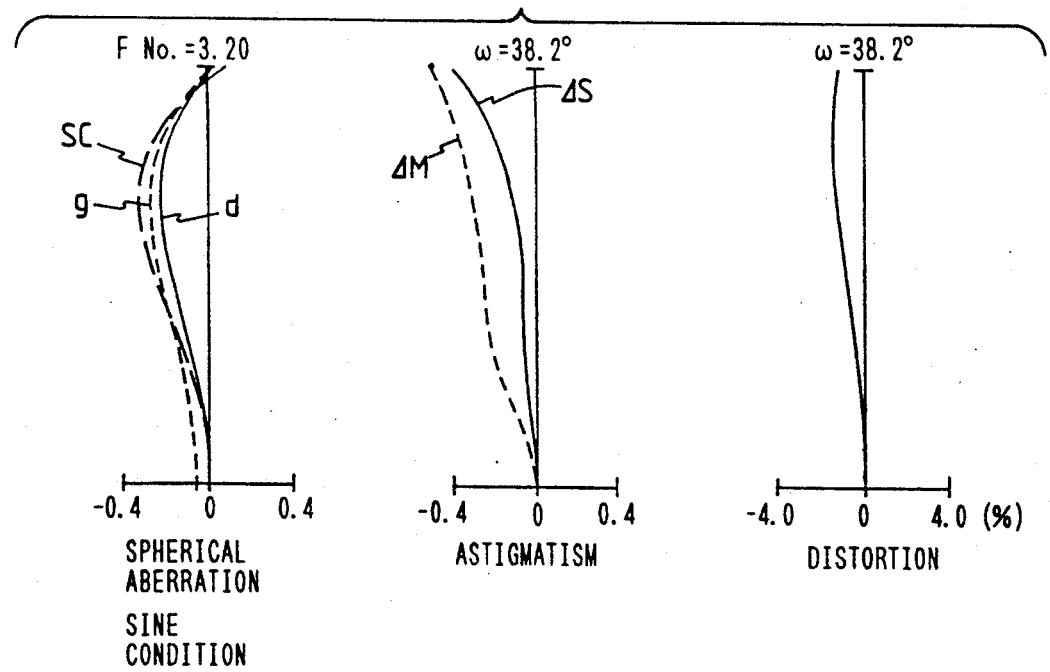

ZOOM LENS

BACKGROUND OF THE INVENTION

1. Field of the Invention

The present invention relates to a small zoom lens, and particularly to a zoom lens suitable for a lens shutter type compact camera with less limit of backfocus.

2. Description of the Prior Art

As a zoom lens comprising a first lens unit having a negative focal length, a second lens unit having a positive focal length and a third lens unit having a negative focal length in order from an object side, a zoom lens of a wide angle system has been heretofore known from Japanese Patent Application Laid-Open Publication No. 75108/19833, Japanese Patent Publication No. 50327/1983 and the like. However, these zoom lenses are intended to be used as photographic lenses for single-lens reflex, and have a long backfocus. Therefore, even at the shortest focal length end in which projection of a lens from a camera is shortest, the distance from the extreme end of a lens to an imaging plane is long. When this is employed for a photographic lens for a lens shutter type compact camera, the lens becomes too long so that it can not be employed for a camera desired to have a compact property when being carried.

On the other hand, as zoom lenses comprising three lens units similar to that as described above in which the backfocus at the shortest focal length end is short and which are suitable for a lens shutter type compact camera, those disclosed in Japanese Patent Application Laid-Open Publication Nos. 271214/1988, 72114/1989 and the like have been known. In these zoom lenses, overall length of the lens is compact despite high variable power. However, a moving amount of the third lens unit is large in order to realize the high variable power.

In these zoom lenses comprising three lens units, three units are required to be moved independently of one another. When the unit is moved by use of a cam in a conventional manner, three different cam grooves have to be made for a single cam cylinder so that a torque necessary for driving the cam cylinder increases. In order to relieve the torque, it is necessary to make an inclination of each cam small, and the diameter of the cam cylinder becomes large. In addition, the length in a direction of an optical axis of a member for holding and moving the lens unit also becomes long. Particularly in the case where the moving amount of the third lens unit is largest among three lens units, this moving amount greatly influences on the compactness in a direction of an optical axis.

The zoom lenses proposed in the aforementioned Japanese Patent Application Laid-Open Publication Nos. 271214/19988, 72114/1989 and the like are suitable for a lens shutter type compact camera which is reduced in the overall length of the lens despite the high variable power. However, in these zoom lenses, the curvature of field in the periphery of an image plate has a very large value, and a change caused by the variable power is also large. For this reason, an image quality of a peripheral portion of an image plane in an infinite far depiction and a photography of a plane object lowers, and with respect to a solid object at a finite distance, a depiction having a sense of incompatibility results.

On the other hand, recently, it has been desired that the zoom lens be provided with a close photographic function. If an attempt is made to obtain a high variable power and compact zoom lens, a refracting power of each of lens units constituting a zoom lens tends to be large. In a method for focussing by independently moving lens units, which is a system ordinarily employed, such as a focussing system for moving a first lens unit, a rear focus system and the like, a change in aberration caused by focussing is so large that the aberration becomes difficult to be well corrected in the range of distance of an object from an infinite far point to a near point. In the system for extending the first lens unit, it is necessary to make a diameter of a front lent larger in order to secure a quantity of marginal light when the first lens unit is extended, impairing the compactness. On the other hand, in the rear focus system, the moving amount of rear lens units for focussing is fifferent even with respect to the object at the same distance according to the focal length, and a focussing mechanism tends to become too complicated.

SUMMARY OF THE INVENTION

The present invention provides a zoom lens in which the moving amount of lenses is small, which is compact including a variable power mechanism and yet has a high variable power more than two times, and which has an excellent performance in photography from a near distance to an infinite far distance.

For achieving the aforesaid object, a zoom lens according to the present invention comprises, in order from an object side, a first lens unit having a negative focal length, a second lens unit having a position focal length, and a third lens unit having a negative focal length, wherein a spacing between the first lens unit and the second lens unit and a spacing between the second lens unit and the third lens unit are monotonously reduced while moving the lens units toward the object side in case of variable power from the shortest focal length end to the longest focal length end, characterized in that let $f_3$ be the focal length of the thirt lens unit and $Y_M$ be the half of a diagonal length of an image plane, the following condition is fulfilled:

$$0.8 < |f_3|/Y_M < 1.2 \tag{1}$$

Furthermore, let $e_{1w}$ and $e_{1T}$ be the spacing between principal points at the shortest focal length end and the longest focal length end of the first lens unit and second lens unit, respectively, and let $e_{2w}$ and $2_{2T}$ be the spacing between principal points at the shortest focal length end and the longest focal length end of the second lens unit and third lens unit, respectively, then the following condition is fulfilled:

$$1.2 < \frac{e_{1w} - e_{1T}}{e_{2w} - e_{2T}} < 3.0 \tag{2}$$

Moreover, in the structure of each of the aforementioned lens units, said first lens unit comprises, from the object side, one or more negative lenses and positive lenses, said second lens unit includes at least two positive lenses and at least one negative lens, and said third lens unit comprises at least one positive lens and at least one negative lens, characterized in that let $n_{2p}$ be the average value of refractive index of the positive lenses in said second lens unit and $\nu_{2p}$ be the average value of Abbe's number, the following conditional formulae are fulfilled:

$$n_{wp} < 1.6 \quad (3)$$

$$\mu_{wp} > 55 \quad (4)$$

This zoom lens comprises a first lens unit having a negative focal length, a second lens unit having a positive focal length and a third lens unit having a negative focal length. The refracting power of units adjacent to each other have different symbols, and therefore, the effect of variable power with respect to the varying amount of spacing is great. In addition, in the case where a diaphragm is provided in the second lens unit, the refracting power symmetrical with respect to the diaphragm is arranged. Therefore, correction of the nonaxial aberrations such as distortion or the like becomes easy. According to the zoom lens of the present invention, in case of variable power from the shortest focal length end to the longest focal length end, the lens units are moved so that the spacing between the lens units is shortened. Accordingly, the moving amount of the lens units increase in order of the first unit, the second unit and the third unit. The moving amount of the third lens unit is largest.

On the other hand, it is necessary for making the magnification ratio large to make the refracting power of each lens unit large or to make the varying amount of spacing of each lens unit large.

When the varying amount of spacing is made large, the moving amount of the lens unit becomes large. As a result, the lens system including the variable power mechanism tends to become large. When the refracting power of the lens unit is made large, aberration tends to occur, and the change of aberration caused by variable power also tends to become large.

In view of the foregoing, in the present invention, there is provided a high variable power and compact zoom lens in which the refracting power of the third lens unit is large, and the moving amount of the largest third lens unit is small. In the zoom lens of this type, the aberration occurring in the forward lens unit is enlarged to influence on the image forming performance. Therefore, it is desirable that the refracting power of the third lens unit be increased in consideration from the viewpoint of aberration correction.

The conditional formula (1) relates to the focal length of the third lens unit. When the value exceeds the upper limit of the formula (1), the moving amount of the third lens unit increases. When the value is less than the lower limit, the refracting power of the third lens unit becomes excessively large, and the aberration in the third lens unit tends to be affected thereby. In addition, the radius of curvature of the negative lens of the third lens unit becomes small, making processing difficult.

In the zoom lens of the present invention, the refracting power of the first lens unit subjected to a potent influence of aberration is made small and the change of spacing between the first and second lens units is made large so that the magnification ratio increases. The conditional formula (2) relates to the change of spacing between the units in the variable power, in which the change of spacing between the first and second unit sis made larger than that between the second and third units. When the value exceeds the upper limit of the formula (2), the spacing between the units at the shortest focal length end becomes large, and the overall length of the lens becomes excessively long with the result that the lens diameter of the first lens unit becomes large. When the value is less than the lower limit of the formula (2), the magnification ratio becomes mall or the refracting power of the first lens unit becomes large, making correction of aberration difficult or being susceptible to errors in processing and assembly to make precision of processing and assembly severe.

As described above, according to the zoom lens of the present invention, in the first lens unit subjected to a potent influence of aberration, the change of spacing between the units is made large to thereby obtain a magnification ratio, and in the third lens unit in which the size of a camera is affected by the moving amount, the refracting power is made large to thereby obtain a magnification ratio.

Furthermore, in the zoom lens of the present invention, there are many negative lens units, and the Petzval's sum tends to have a large negative value. The curvature of field will be overcompensated and the astigmatism is also large. In the zoom lens of the present invention, therefore, the refractive index of a positive lens out of the second lens unit on which a positive refracting power is concentrated is selected so as to fulfill the conditional formula (3) to thereby make the Petzval's sum small.

Moreover, the conditional formula (4) relates to the chromatic aberration. When the value is less than the lower limit of the formula (4), axial chromatic aberration will be under compensated, and the magnification chromatic aberration on the shortest focal length side becomes large.

It is advantageous in correction of aberration that an aspherical surface be used for at least one surface of the second lens, and the refractive index of the aspherical lens be less than 1.7.

It is further desired that an aspherical surface be used for at least one surface out of the third lens unit, and the refractive index of the aspherical lens be less than 1.7.

More definitely, it is characterized in that the shape of the aspherical surface of the second lens unit is formed so that the ray directed at the lens margin is emanated, and the shape of the aspherical surface of the third lens unit is formed so that the ray toward the lens margin is condensed or not emanated.

The zoom lens of the present invention has a simple and effective structure designed to realize a high variable power zoom lens in which the change of the focal length of the whole system with respect to the change of the spacing between the units as described above. In addition, when a diaphragm is arranged on the second lens unit, the arrangement of the refracting power before and behind the diaphragm is close to a symmetry in the whole variable power area to render correction of aberration, particularly the nonaxial aberration easy, tending to have a wide angle.

However, with such a structure as described above, units having a negative focal length are more than units having a positive focal length, and the Petzval's sum tends to have a large negative value. Therefore, it is necessary to increase the refracting power of the positive lens unit, and a short of correction of spherical aberration tends to result. When an aspherical surface is provided in the first lens unit to correct the spherical aberration, the height from the optical axis of the nonaxial rays passing through the first lens unit considerably changes between the shortest focal length end and the longest focal length end, due to the change in angle of field, resulting in a difference in effect of the aspherical surface. Therefore, the variation of the curvature of field caused by the variable power increases at a place where the image height is high. This is conspicuous when the diaphragm is arranged at the rear of the second lens unit. On the other hand, when the diaphragm is arranged frontwardly of the second lens unit, the difference of the path of the nonaxial rays caused by the variable power in the third lens unit is larger than that of the first lens unit, and the variation of the curvature of field caused by the aspherical surface of the first lens unit is slightly small. However, in this case, the diameter of lens of the third lens unit becomes large, and since this unit moves most greatly due to the variable power among three lens units, a camera becomes large-sized.

On the other hand, when an aspherical surface is provided in the second lens unit, the height at which the nonaxial pencil of rays passes does not much change even by the variable power, and the variation of the curvature of field due to the difference of the effect of the aspherical surface as mentioned above can be made small to satisfactorily correct the spherical aberration. In this case, the shape of the aspherical surface is formed such that the ray may be enamated along the lens margin, that is, the negative refracting power increases.

In the zoom lens constructed as described above, the processing accuracy of the second lens unit tends to be severe, and the surface accuracy required for the aspherical surface also becomes high. When the processing accuray is high, the cost increases, and it is therefore desired that the refractive index be less than 1.7 so as to decrease the influence of the processing accuracy of the surface. When the refractive index is made small as described, the refractive angle with respect to the local surface shape can be made small. Therefore, the influence of an error of the surface shape can be reduced.

Furthermore, when an aspherical surface is used in the second lens unit to correct an aspherical aberration and when a satisfactory correction state is attained at the shortest focal length end, surplus correction tends to occur at the longest focal length end. When an aspherical surface is used which has a shape such that emanation of the ray becomes small toward the margin of the lens of the third lens unit, that is, the positive refracting power increases or the negative refracting power decreases, in the third lens unit, nonaxial pencil of rays passed through a location away from the optical axis at the longest focal length end, and therefore, the effect of the aspherical surface is greater than that of the shortest focal length end, and the surplus correction at the longest focal length end can be selectively corrected. Although the third lens unit is not severe in the processing accuracy as compared with the second lens unit, it is preferable that the refractive index of the aspherical lens be less than 1.7 in terms of readiness of processing.

It is characterized in that in order to suppress the variation of aberration caused by focussing, among a plurality of lens units constituting a zoom lens, the first lens unit comprises, from an object side, a negative 1-a lens component and a positive 1 -b lens component having at least a positive lens, and the first lens unit is moved forward while varying a spacing between the 1—a lens component and the 1—b lens component to thereby effect focussing.

For example, more definitely, the first lens unit comprises, from an object side, a negative 1-a lens component comprising a biconcave lens and a positive 1-b lens component including at least a positive lens, and the first lens unit is moved forward while spreading a spacing between the 1- a component and the 1-b lens component to thereby effect focussing.

It is desired in simplifying a focussing mechanism that let $D_{ab}$ be the varying amount of the spacing between the 1-a lens component and the 1-b lens component and $D_1$ be the moving amount of the first lens unit in the focussing, $D_{ab}/D_1$ is maintained constant in the focussing with respect to an object in the focussing range.

As the refracting power of each of the lens units increases become of the high magnification ratio, the radius of curvature of the lens surface constituting a negative first lens unit becomes small. Particularly, in the first lens unit, the radius of curvature of the lens surface having a negative refracting power becomes small. Therefore, when the first lens unit is extended to effect focussing, the nonaxial pencil of rays having a large incident angle passing through the first lens unit passes a location away from the optical axis of the first lens unit, and the curvature of field becomes overcompensated. This is conspicuous at the shortest focal length end at which angle of view is large.

The 1-a lens component in the first lens unit is a negative lens, which has a large refracting power than the whole first lens unit. Therefore, when only the 1-a lens component is extended to effect focussing, the extension amount with respect to the object at the same distance is suffice to be less than that of the whole first lens unit. However, when only the 1-a lens component is extended to effect focussing, the height passing the 1-a lens component of the pencil of rays passing the same height of the 1-b lens component lowers and emanation action of the pencil of rays of the 1-a lens component lowers. Therefore, the spherical aberration and curvature of field become undercompensated.

Because of this, when the first lens unit is extended while spreading the spacing between the 1-a lens portion and the 1-b lens portion to effect focussing, the aforementioned effects can be negated each other to prevent the variation of the curvature of field. Since the 1-a lens component is much extended, the extension amount can be reduced as compared with the case where only the first lens unit is extended. Even in this case, since the extension amount can be constant without depending on a zoom positive, the focussing mechanism becomes simple.

In case where the 1-b lens component comprises a negative meniscus lens having a convex surface directed at the object side and a positive lens, the refracting power of the negative lens in the first lens unit can be dispersed, and therefore, the correction of aberration becomes easy, and the higher magnification ratio can be obtained. If the face-to-face relation between the concave surface of the negative lens on the image side and the convex surface of the positive lens on the object side is present in the 1-b lens component, a degradation of aberration caused by the eccentricity between the 1-a lens component and the 1-b lens component becomes small.

It is ideal that movement of the 1-a lens component and movement of the 1-b lens component are made in a suitable ratio using a cam or the like so that the aberration during focussing may be best corrected. However, the extension mechanism is complicated and tends to become large-sized. Therefore, if the moving amount of the 1-a lens component and the moving amount of the 1-a lens component are made so as to have a fixed ratio, a mechanism having gears meshed with each other can be prepared, and therefore, the extension mechanism can be prepared more simply.

BRIEF DESCRIPTION OF THE DRAWINGS

FIG. 1 also shows a method of variable power of a zoom lens according to the present invention.

FIGS. 11, 13, 15, 17 and 19 are sectional views of sisth, seventh, eighth, ninth and tenth examples, respectively, of the zoom lens according to the present invention, showing the case of including an aspherical surface. FIG. 11 also shows a method of variable power of the zoom lens according to the present invention. FIGS. 12A, 12B, 12C, 14A, 14B, 14C, 16A, 16B, 16C, 18A, 18B, 18C, 20A, 20B and 20C show aberrations of the sixth to tenth examples, respectively.

FIG. 21 is a sectional view of an eleventh example of the zoom lens according to the present invention, showing the lens moving locus during focussing simultaneously with variable power. FIGS. 26A, 26B, 26C, 27A, 27B, 27C, 28A, 28B and 28C show aberrations of the twelfth example. In the aberrations, FIGS. 22 and 26 are for an infinite far object, FIGS. 23 and 27 are aberrations with respect to 1 m of an object distance when in the respective examples, the first lens unit is integrally moved to effect focussing, and FIGS. 24 and 28 are in accordance with the focussing method of the zoom lens according to the present invention, the object distance being likewise 1 m. In these aberrations (A) is for the shortest focal length end, (B) is for the middle focal point, and (C) is for the longest focal length end.

DETAILED DESCRIPTION OF THE PREFERRED EMBODIMENTS

Figure 1:
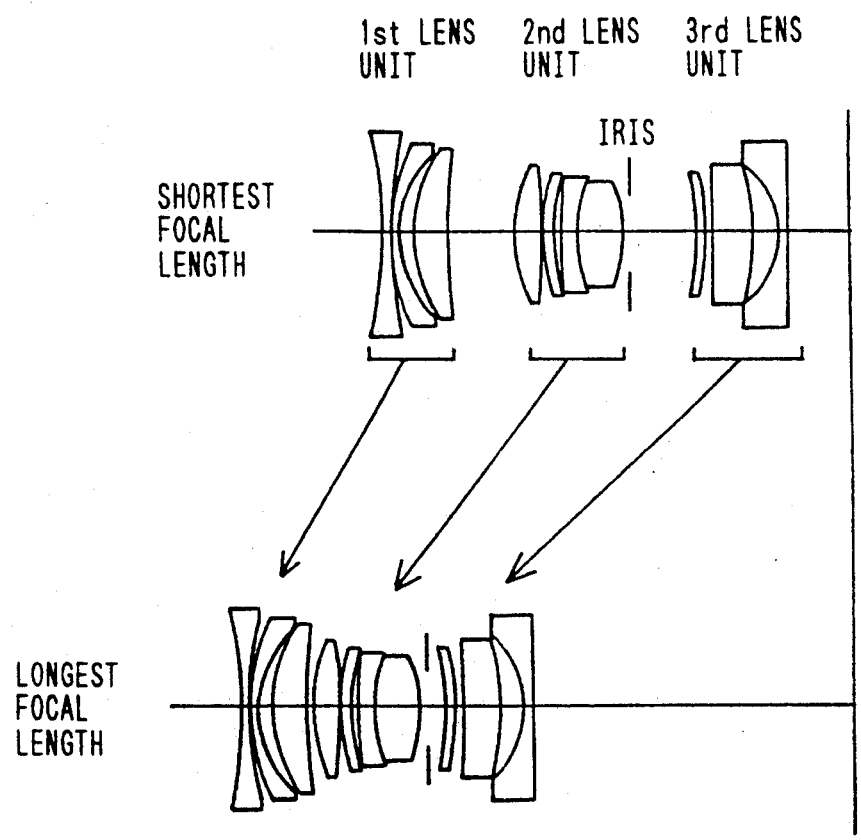
FIGS. 1, 3, 5, 7 and 9 are sectional views of first, second, third, fourth and fifth examples, respectively.
Figure 2A:
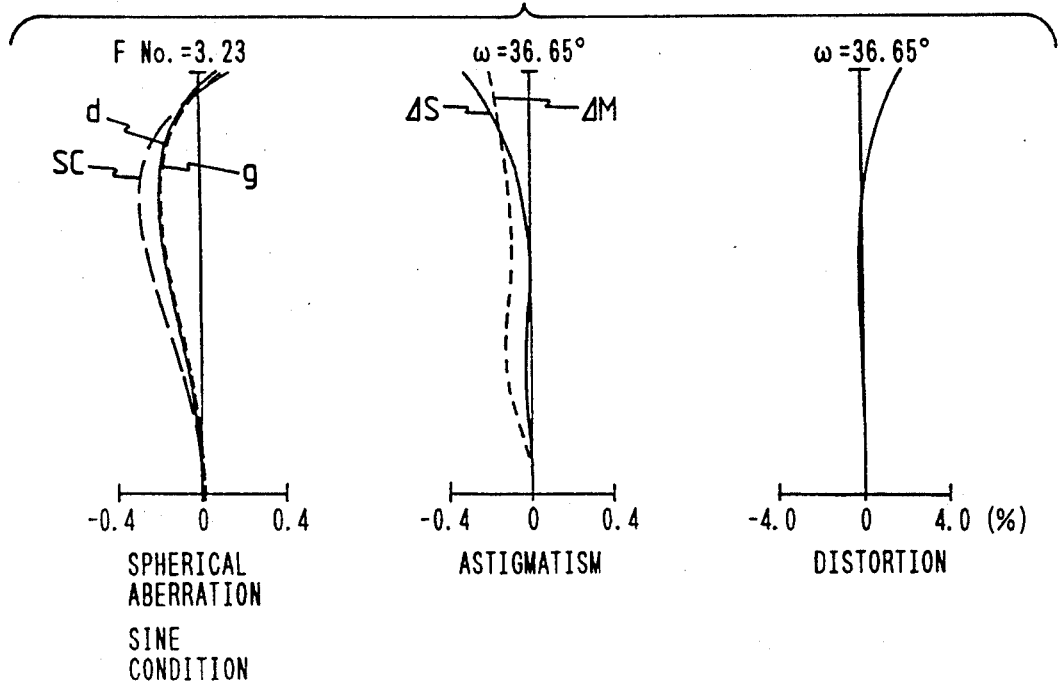
FIGS. 2A, 2B, 2C, 4A, 4B, 4C, 6A, 6B, 6C, 8A, 8B, 8C, 10A, 10B and 10C show aberrations of the first to fifth examples.
Figure 2B:
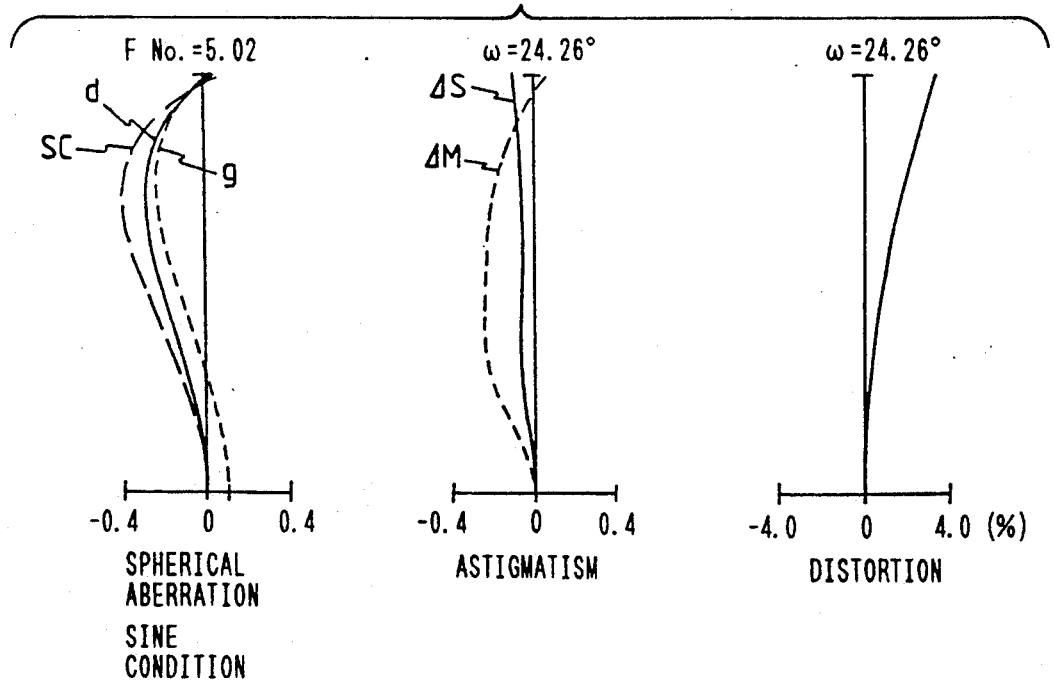
Figure 2C:
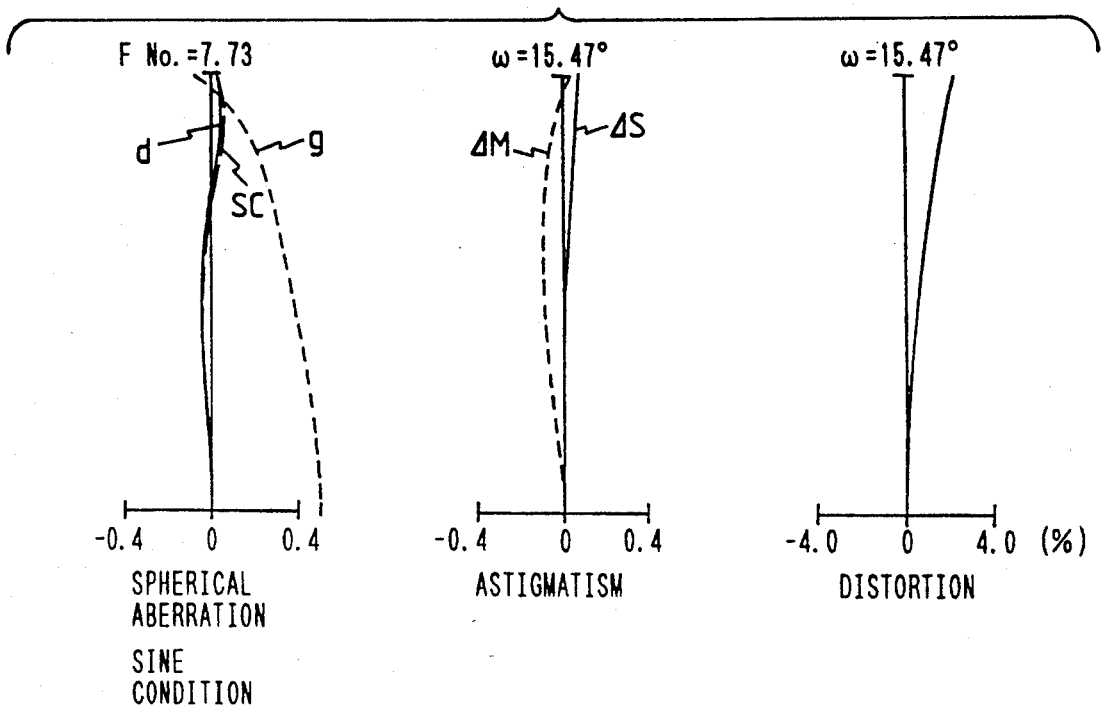
Figure 3:
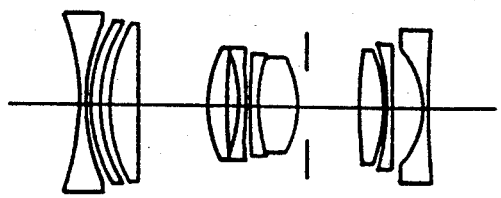
Figure 4A:
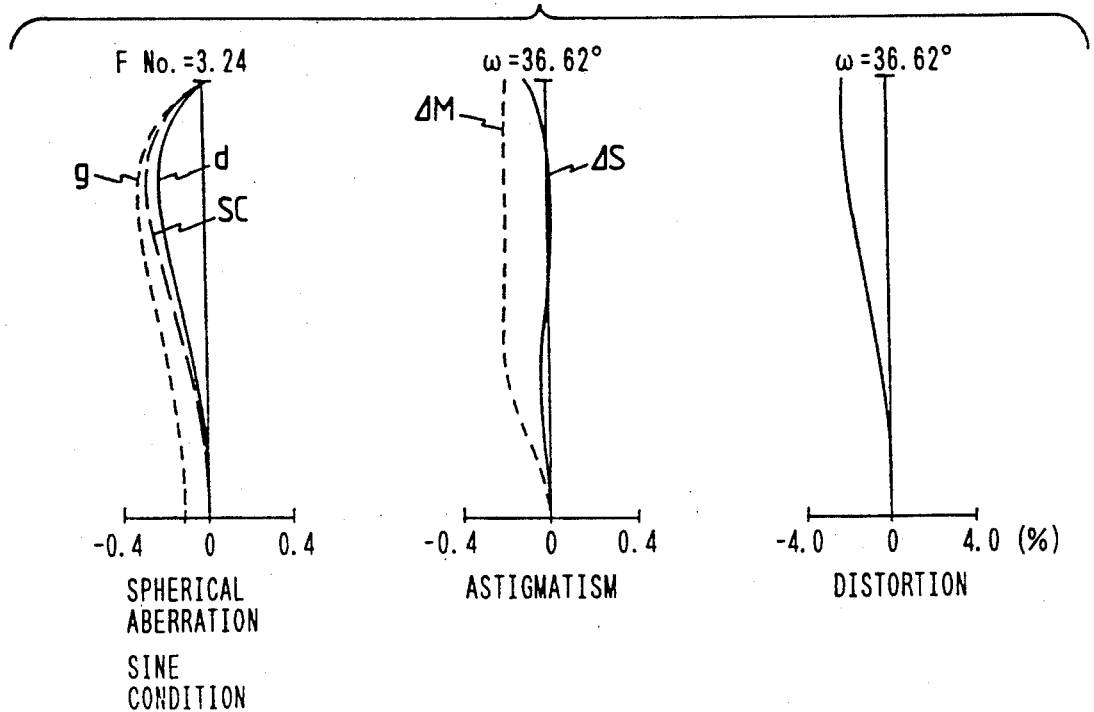
Figure 4B:
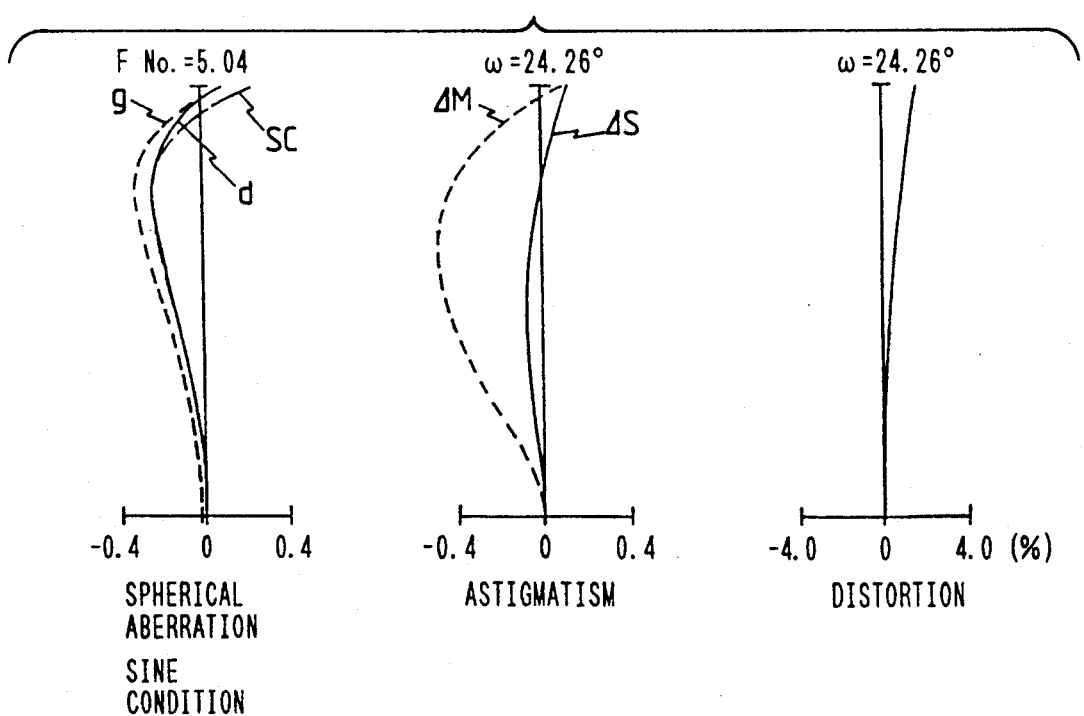
Figure 4C:
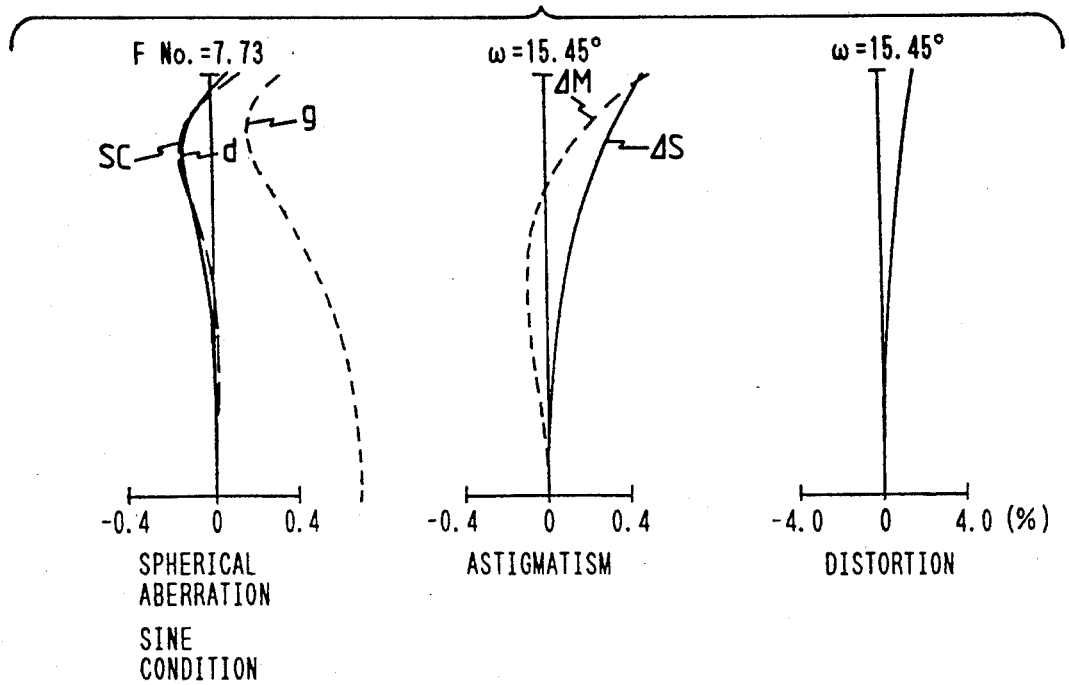
Figure 5:
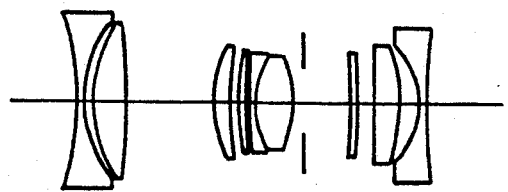
Figure 6A:
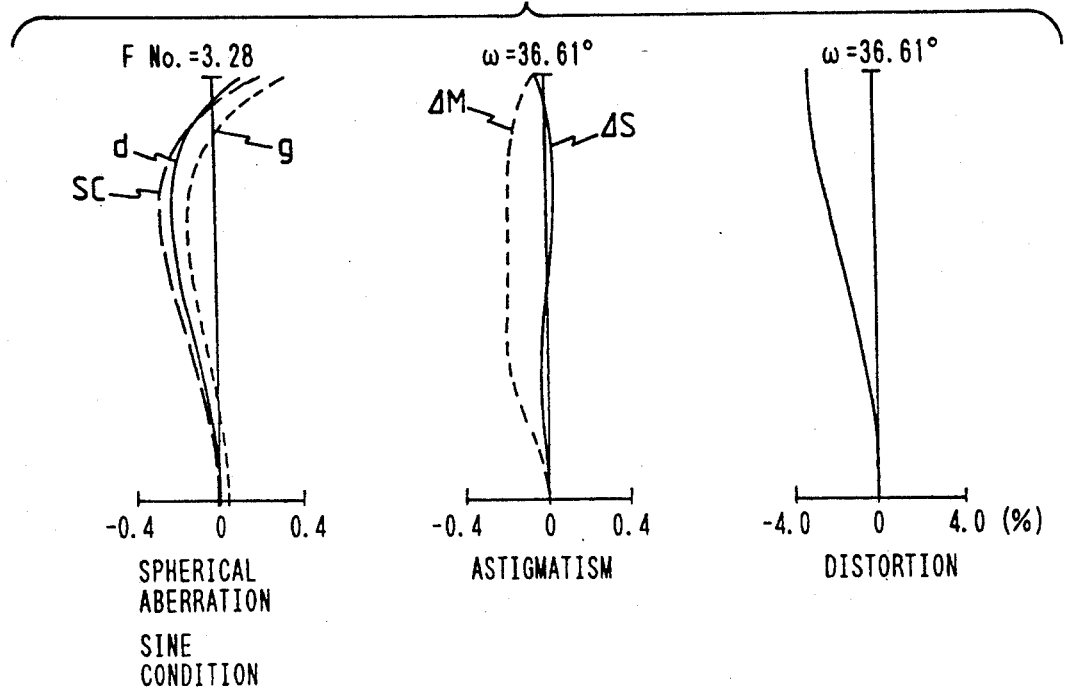
Figure 6B:
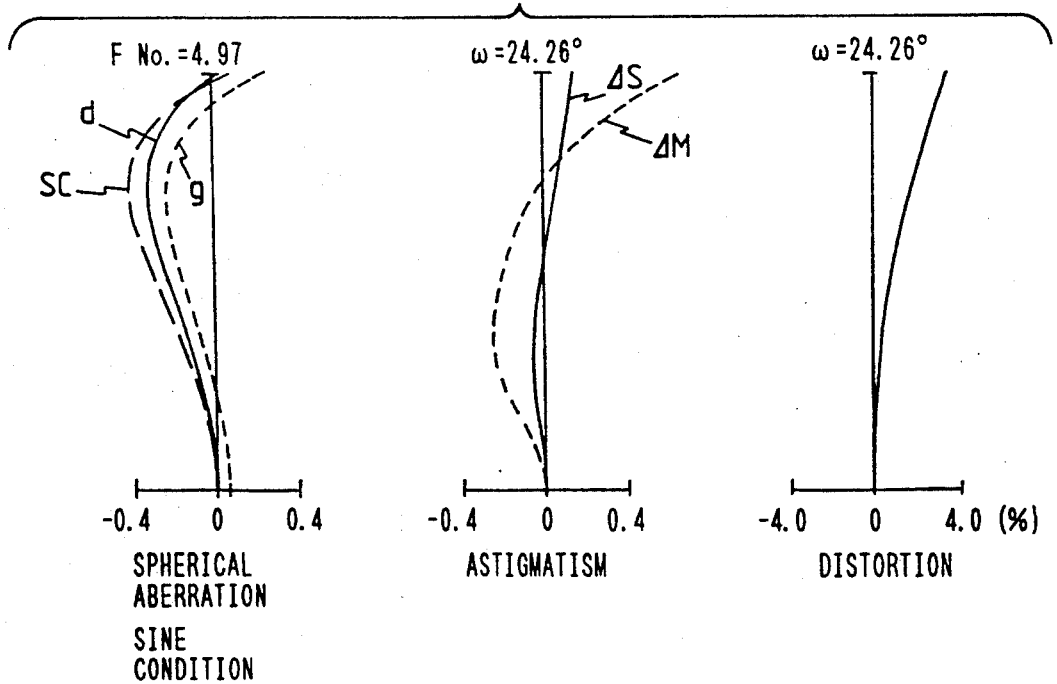
Figure 6C:
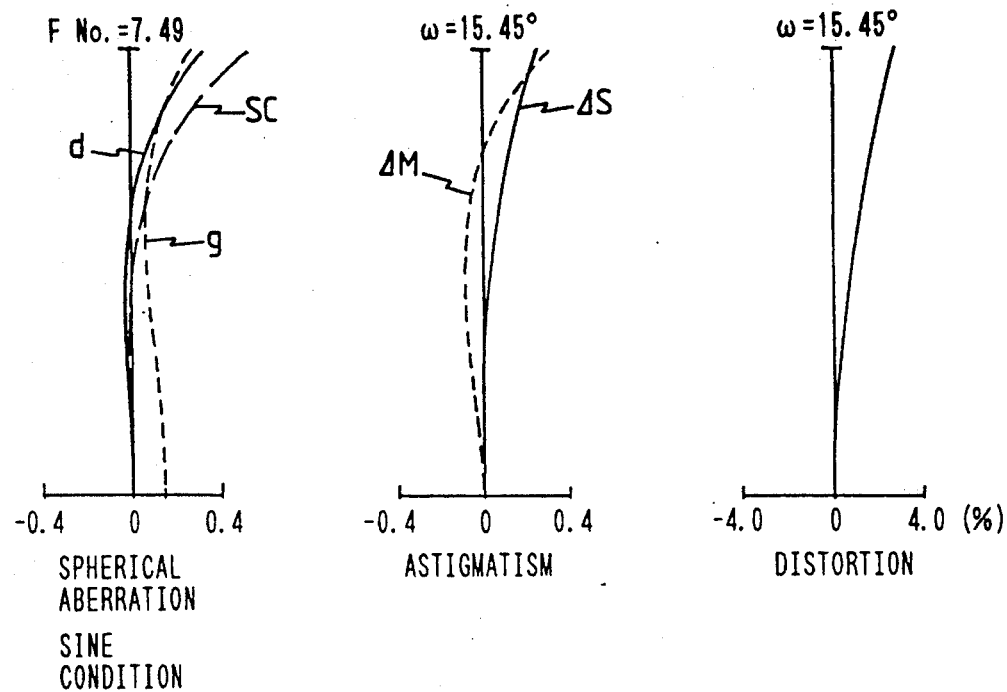
Figure 7:
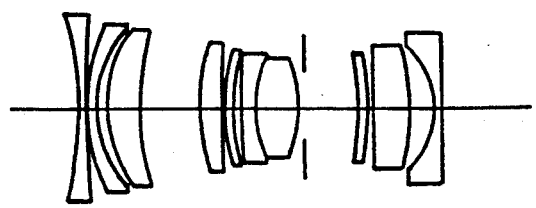
Figure 8A:
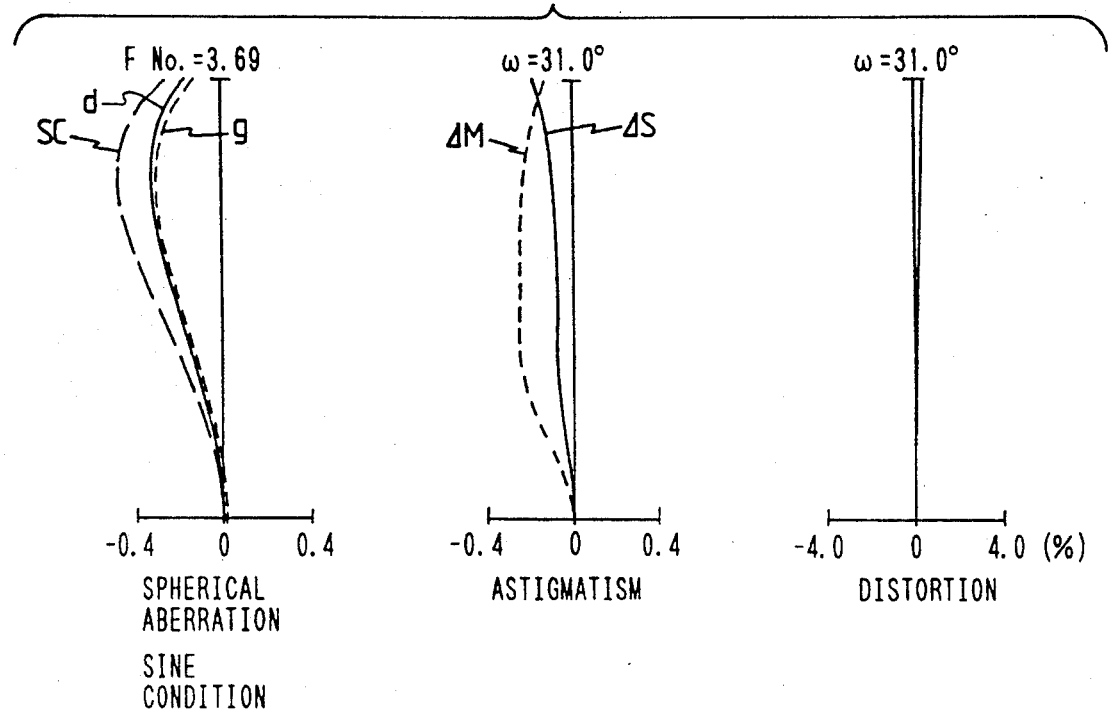
Figure 8B:
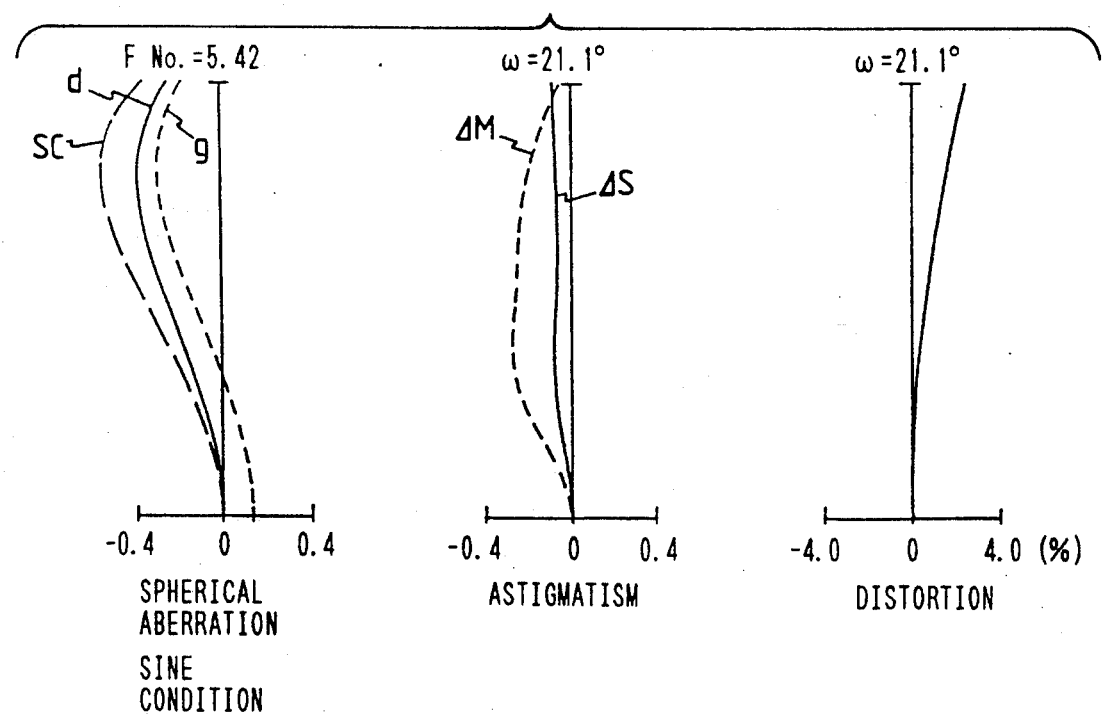
Figure 8C:
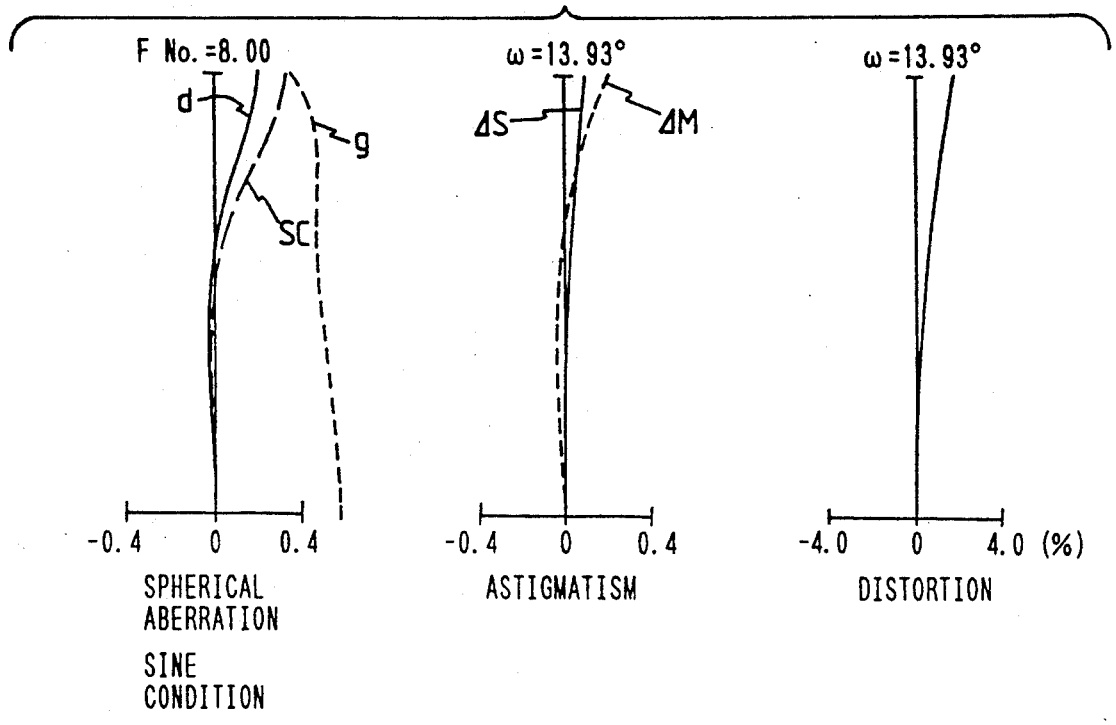
Figure 9:
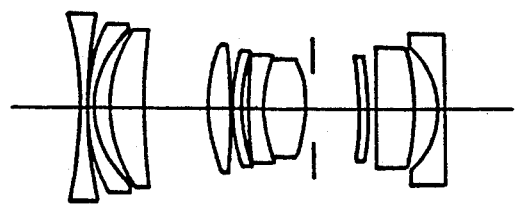
Figure 10A:
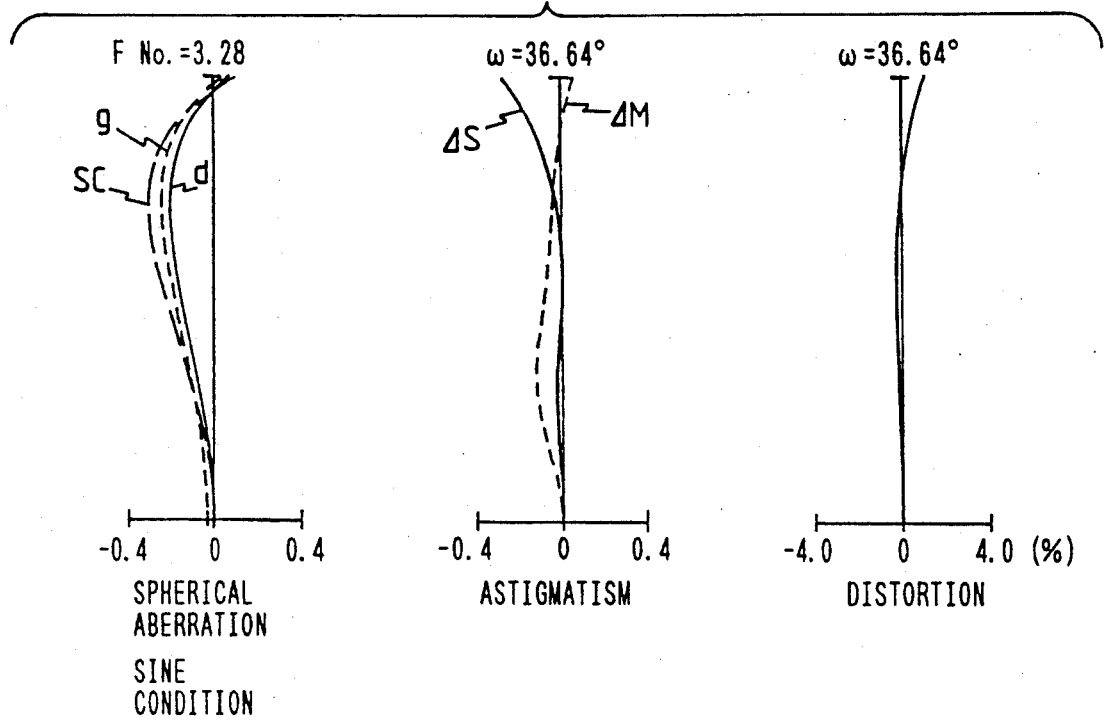
Figure 10B:
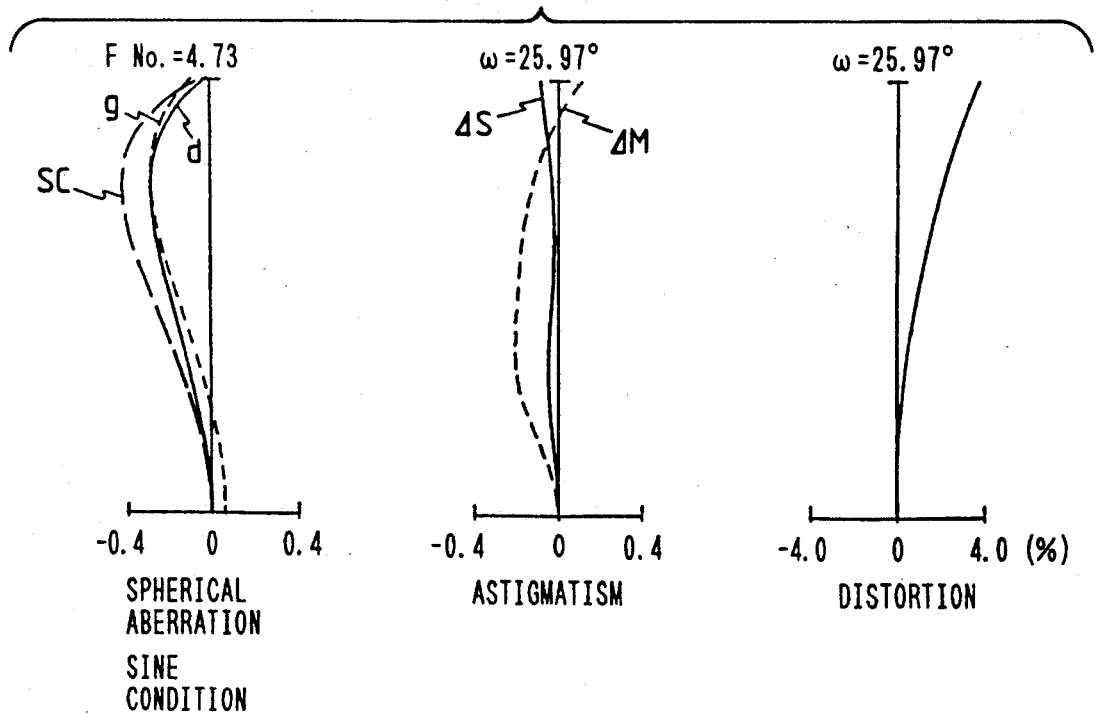
Figure 10C:
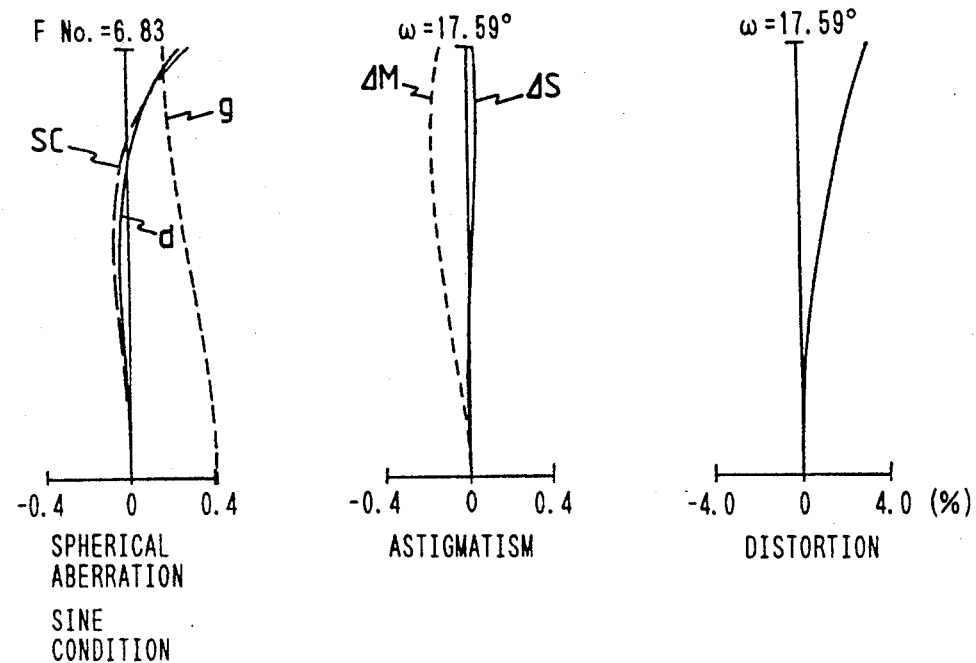
Figure 11:
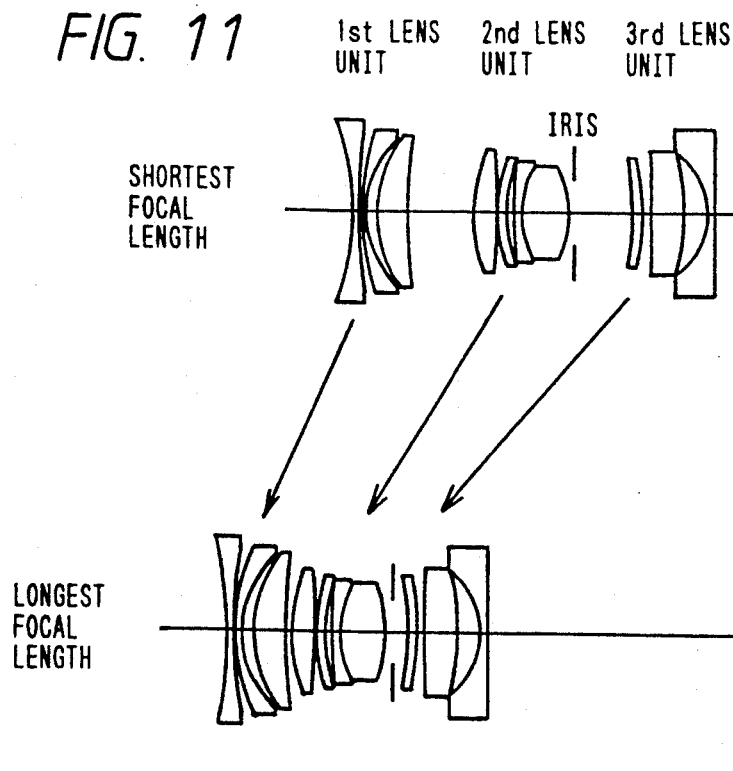
Figure 12A:
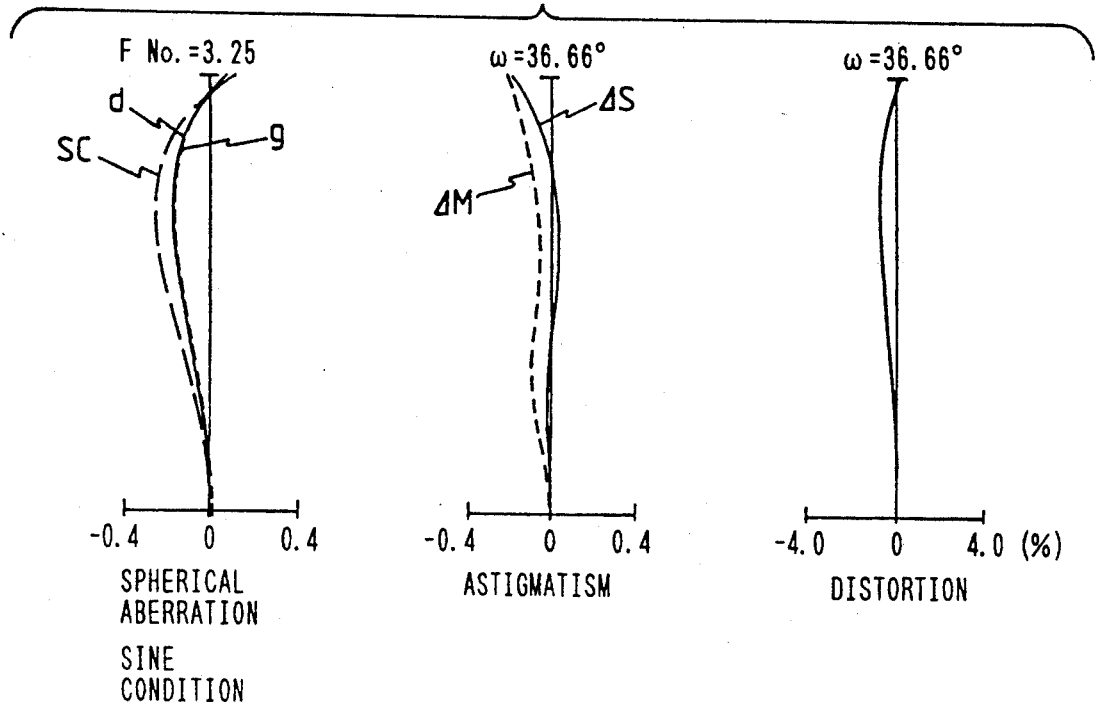
Figure 12B:
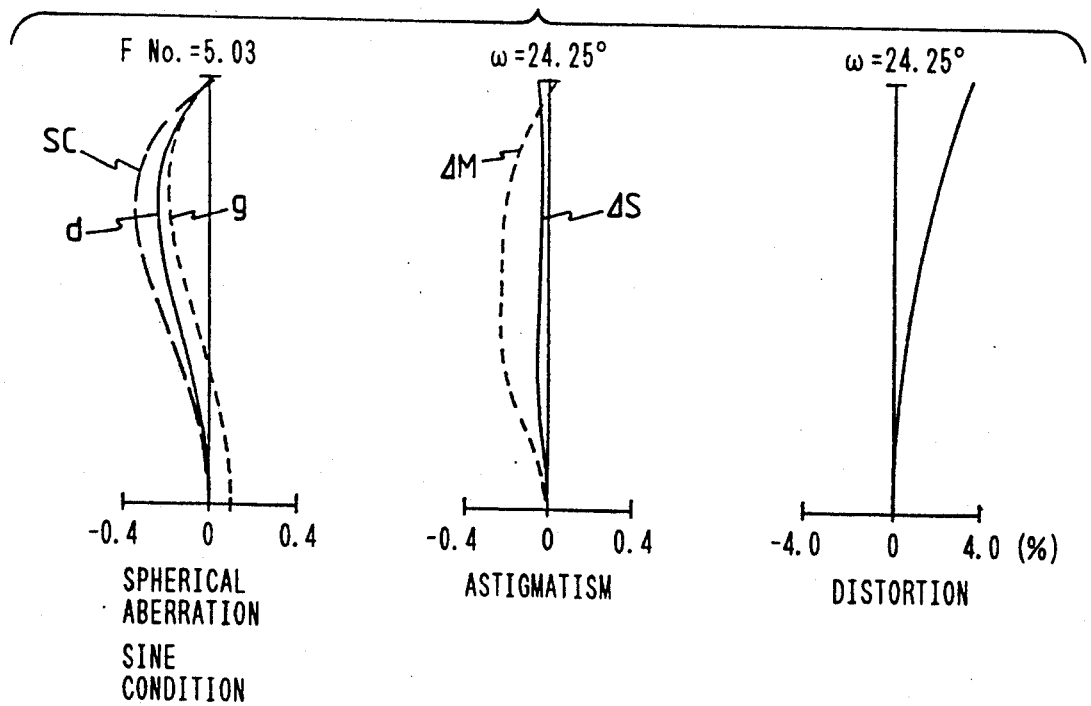
Figure 12C:
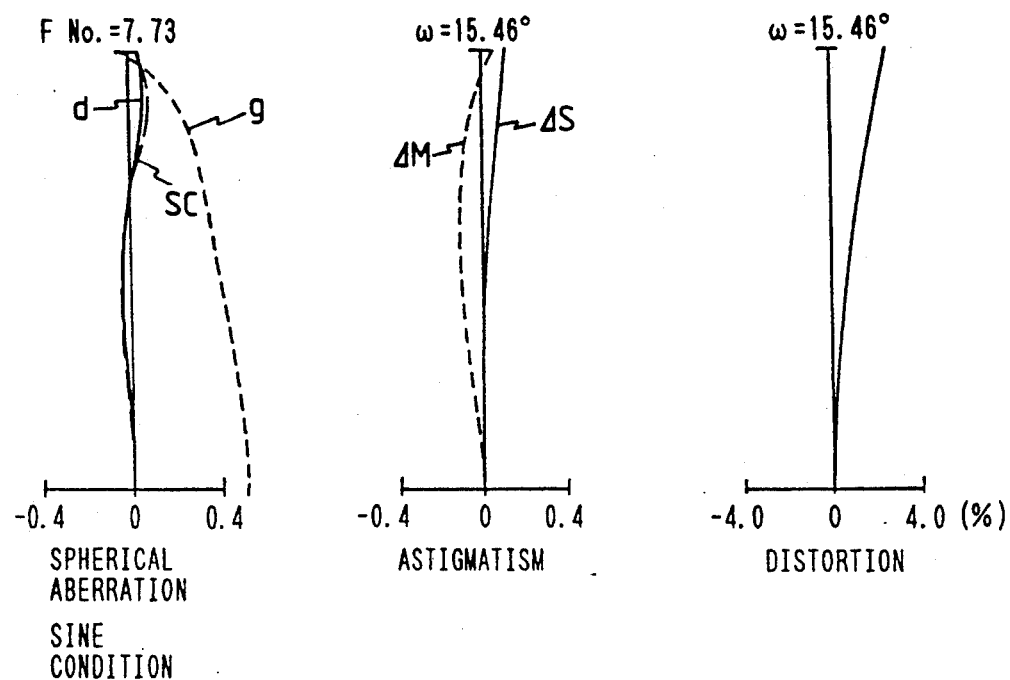
Figure 13:
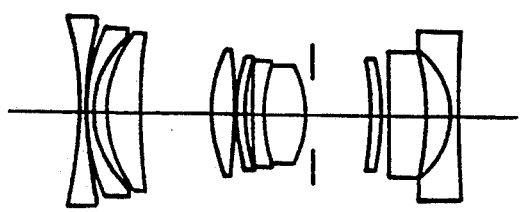
Figure 14A:
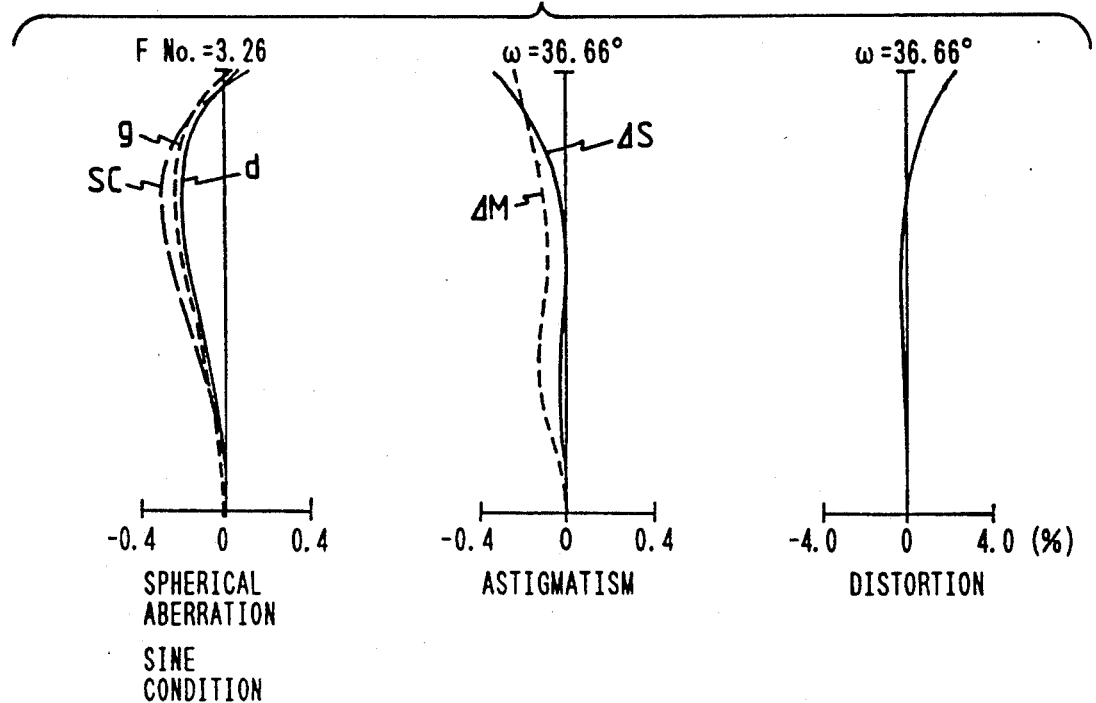
Figure 14B:
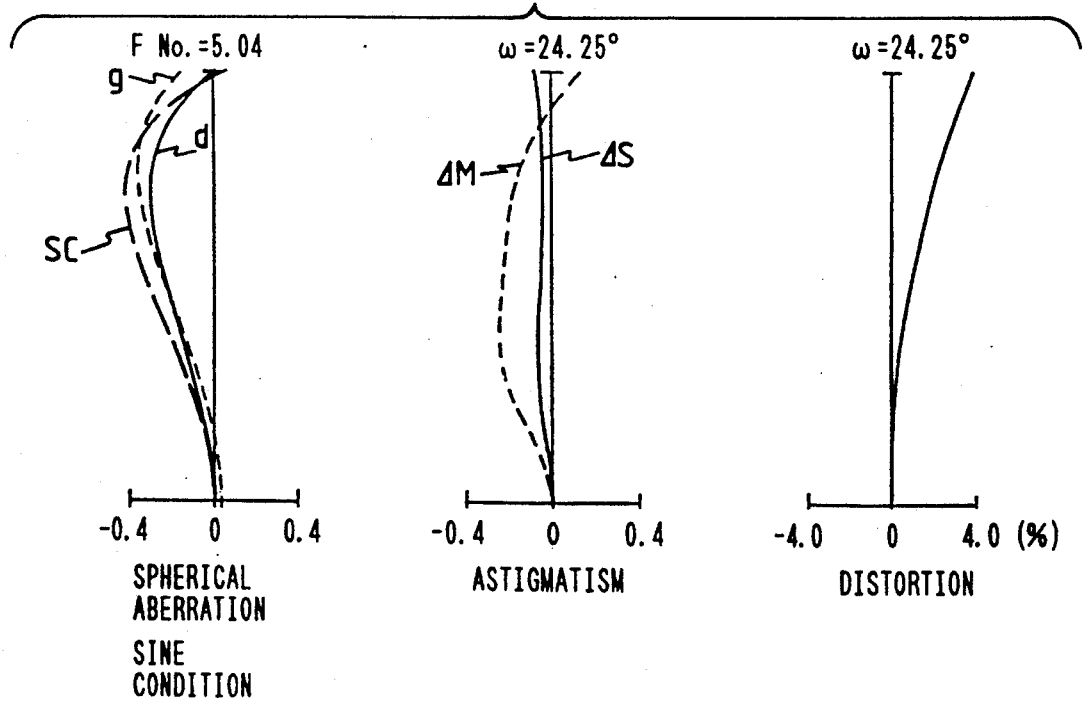
Figure 14C:
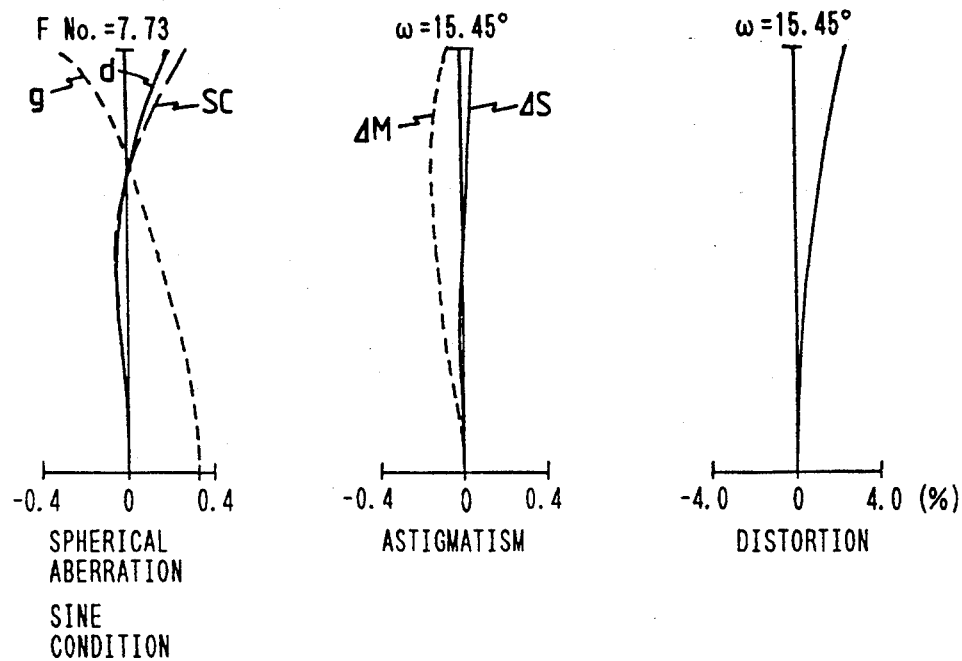
Figure 15:
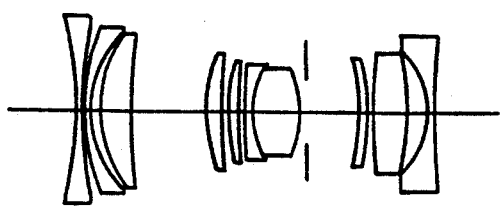
Figure 16A:
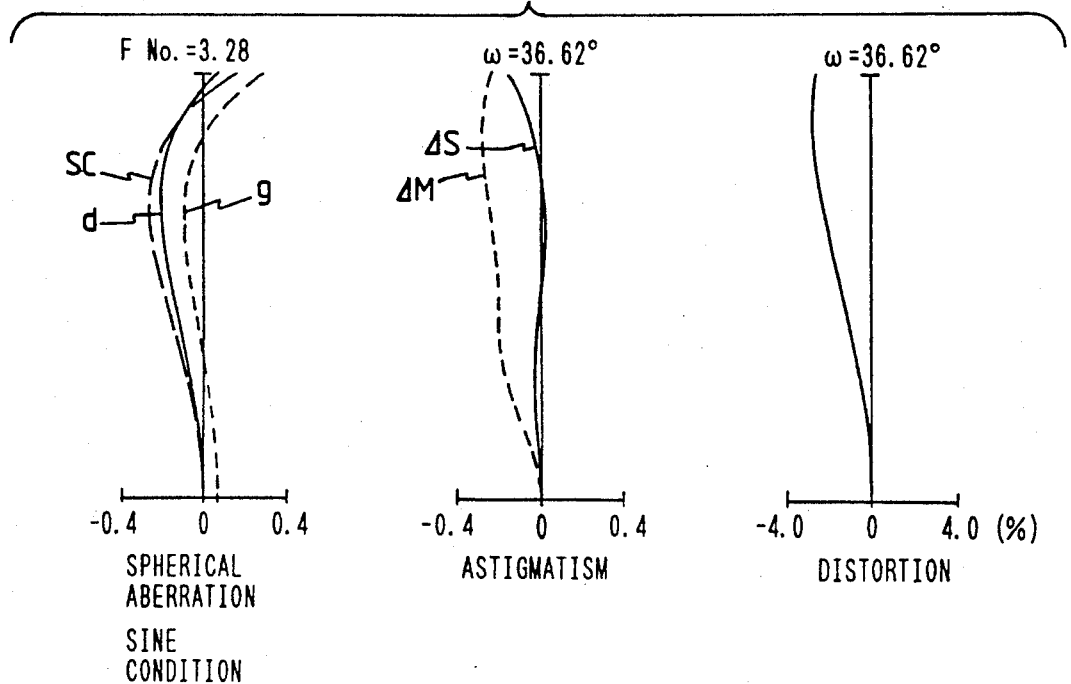
Figure 16B:
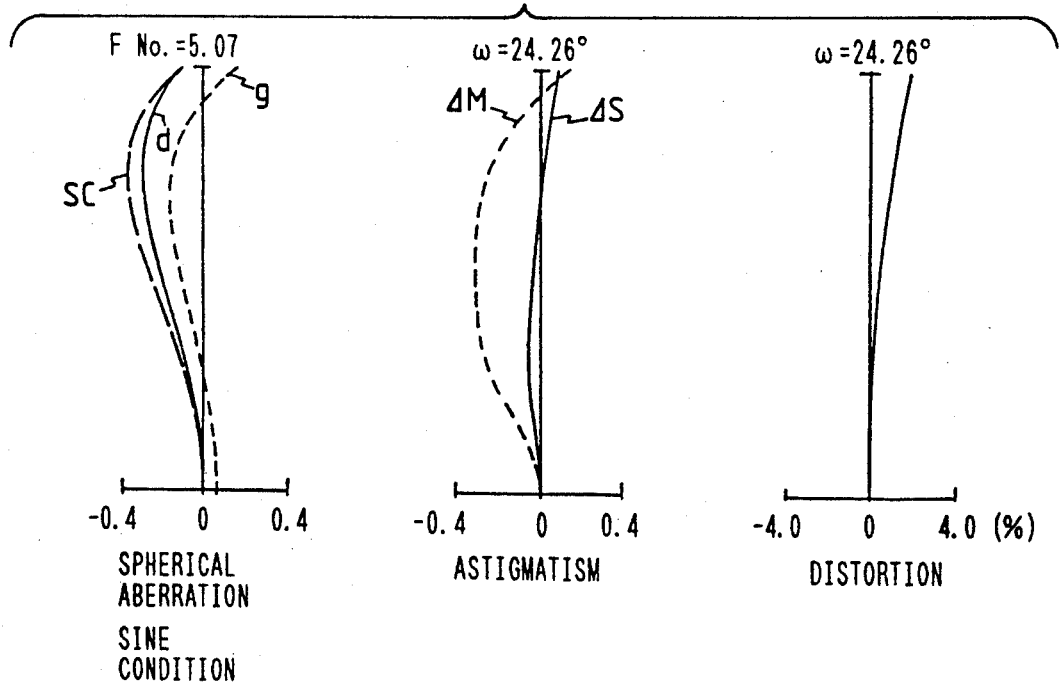
Figure 16C:
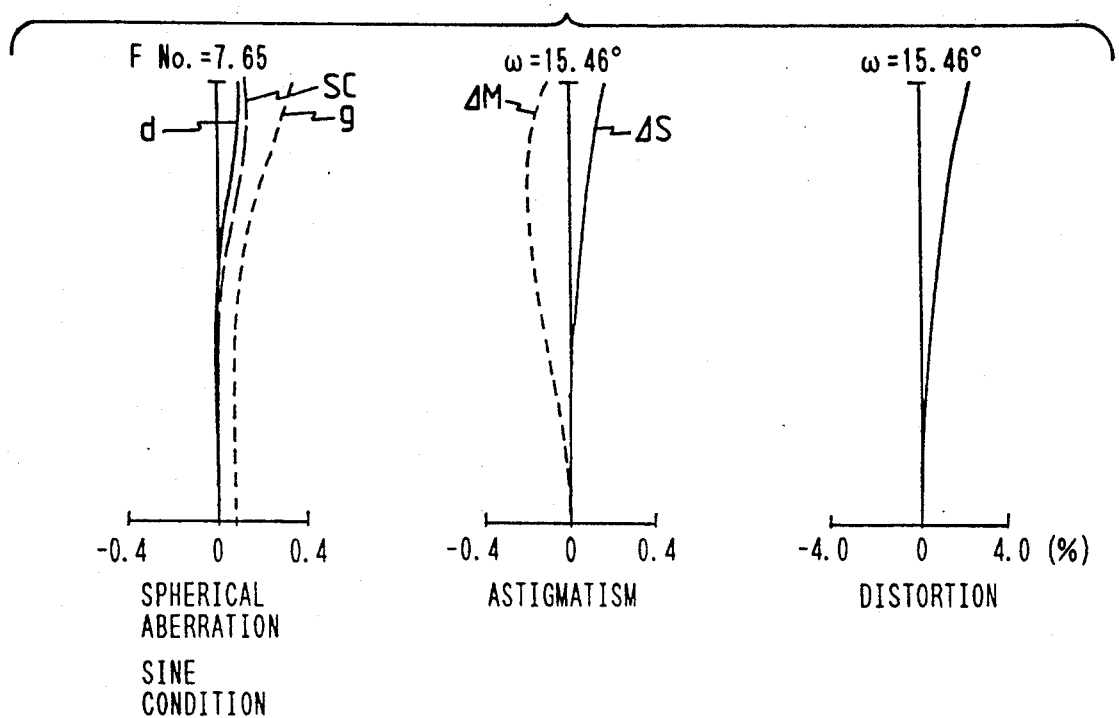
Figure 17:
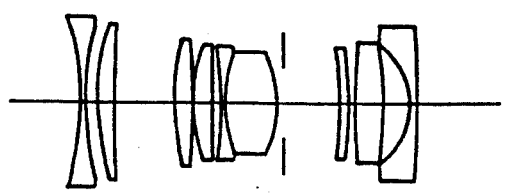
Figure 18A:
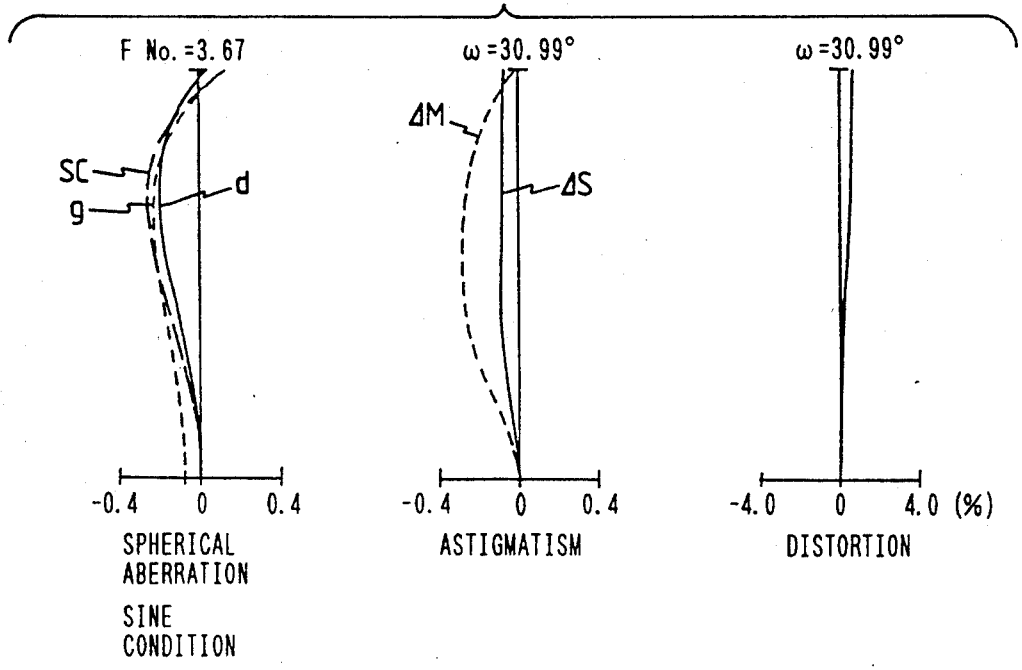
Figure 18B:
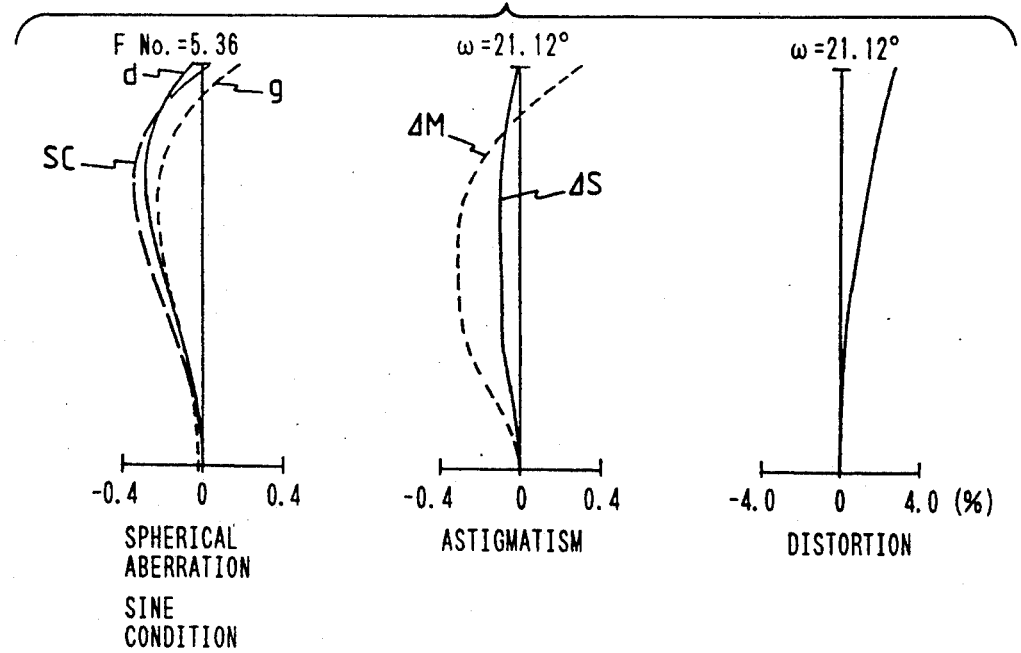
Figure 20A:
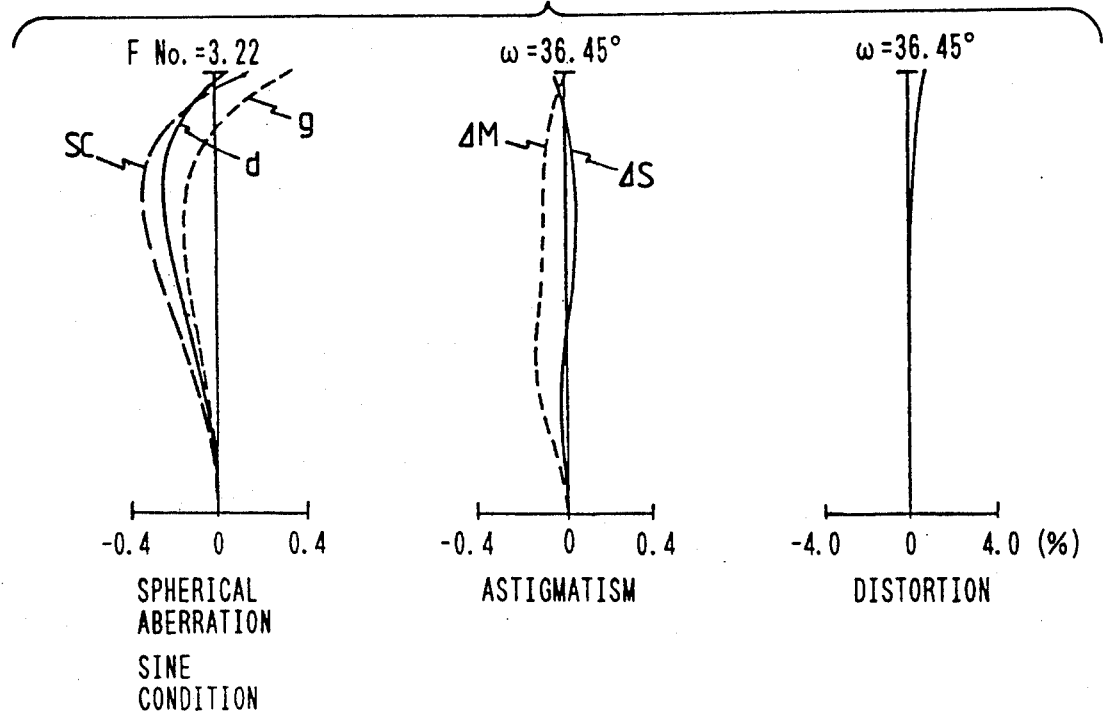
Figure 20B:
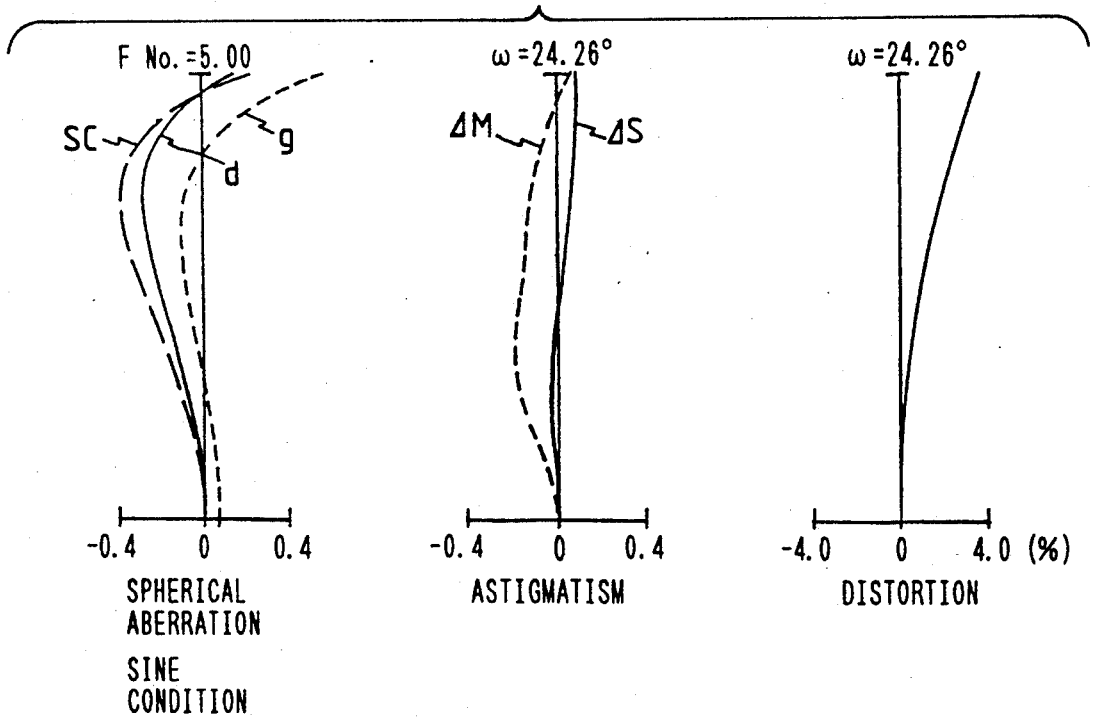
Figure 20C:
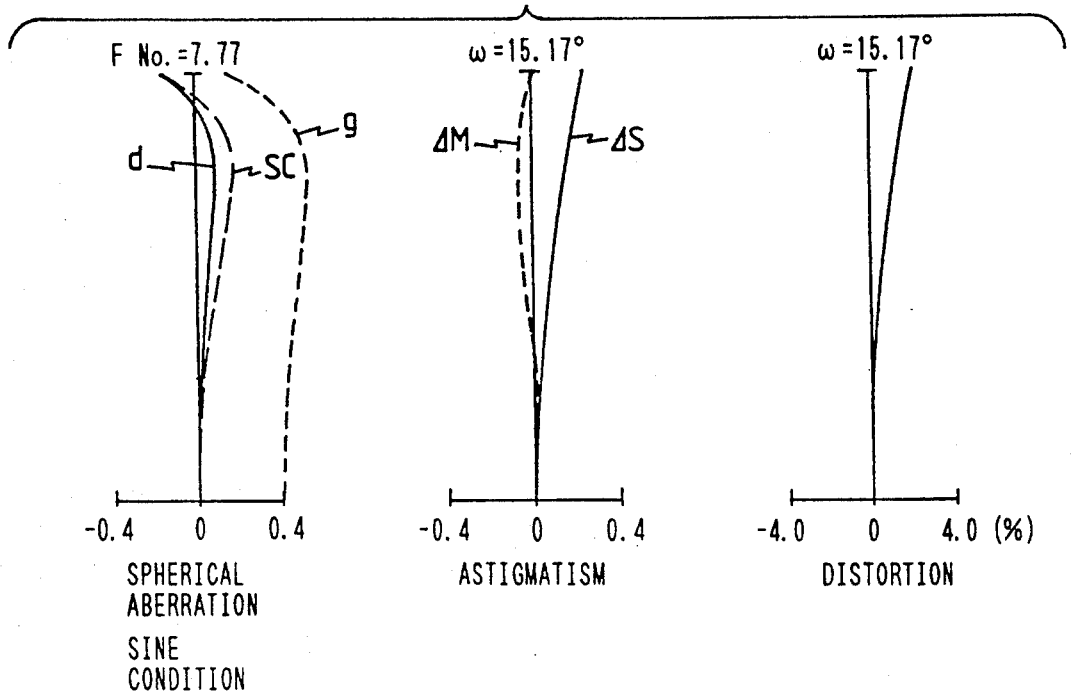

Examples of the zoom lens according to the present invention which are fulfilled with the aforementioned conditions are shown below. In the examples of the present invention, a diaphragm is arranged at the rear of a second lens group, and is moved integral with a second lens group in the variable power. The diaphragm is arranged in the second lens group whereby the first lens group can be made substantially equal in the outer diameter of lens to that of the third lens group. Even if the marginal illumination at the wide angle end is secured, a contour is not particularly large.

In the present invention, focussing can be carried out by moving one or two out of the first, second and third groups. Particularly, if focussing is carried out by the first lens group alon, the extension amount with respect to the object distance can be made constant in the range of variable power, and the mechanism becomes a simple.

In the tables, reference character R designates the radius of curvature of refractive surface; D, the spacing of the refractive surface; $N_d$, the refractive index of lens material; $\nu_d$, the Abbe's number; f, the focal length of the whole lens system; $\omega$, the falf angle of view; F, the F number; and $F_B$, the backfocus.

Surfaces with mark * are aspherical surfaces. The shape of the aspherical surface is that an axis X indicates the direction of an optical axis and an axis Y indicates the direction vertical to the optical axis, the moving direction of light is set to be positive, and let K, $A_1$ and $A_2$ be the coefficient of aspherical surface, then the following formula is given:

$$x = \frac{y^2/R}{1 + \sqrt{1 - (1 + K) y^2/R^2}} + A_1 y^4 + A_2 y^6$$

First example $f = 29.07-78.17 \quad F = 3.23-7.73 \quad \omega = 36.65°-15.47°$

| No. | R | D | $N_d$ | $\nu_d$ |
|---|---|---|---|---|
| 1 | −52.760 | 1.00 | 1.77250 | 49.6 |
| 2 | 53.532 | 0.20 | | |
| 3 | 28.945 | 1.00 | 1.80610 | 40.9 |
| 4 | 15.444 | 1.83 | | |
| 5 | 18.976 | 5.00 | 1.67270 | 32.1 |
| 6 | 110.934 | variable | | |
| 7 | 22.163 | 3.50 | 1.51633 | 64.1 |
| 8 | −131.532 | 0.30 | | |
| 9 | 27.197 | 1.50 | 1.49200 | 57.0 |
| 10* | 32.606 | 1.00 | | |
| 11 | 81.793 | 1.93 | 1.72825 | 28.5 |
| 12 | 15.868 | 6.62 | 1.51633 | 64.1 |
| 13 | −19.138 | variable | | |
| 14* | −34.284 | 1.50 | 1.49200 | 57.0 |
| 15 | −38.543 | 1.00 | | |
| 16 | −540.102 | 5.50 | 1.76182 | 26.6 |
| 17 | −34.974 | 3.40 | | |
| 18 | −11.748 | 1.20 | 1.77250 | 49.6 |
| 19 | 1029.209 | | | |

| f | $D_6$ | $D_{13}$ | $F_B$ |
|---|---|---|---|
| 29.07 | 9.61 | 9.84 | 8.30 |
| 47.99 | 4.79 | 5.56 | 23.04 |
| 78.17 | 0.60 | 3.20 | 44.24 |

| 10th surface aspherical coefficient | 14th surface aspherical coefficient |
|---|---|
| K = 6.90687 | K = 2.35564 |
| $A_1 = 3.08614 \times 10^{-5}$ | $A_1 = 5.94004 \times 10^{-5}$ |
| $A_2 = 2.18977 \times 10^{-7}$ | $A_2 = 4.35857 \times 10^{-7}$ |
| $|f_3|/Y_M = 1.04$ | $(e_{1w} - e_{1T})/(e_{2w} - e_{2T}) = 1.36$ |
| $n_{2p} = 1.51$ | $\nu_{2p} = 61.7$ |

Second example $f = 29.10-78.25 \quad F = 3.24-7.73 \quad \omega = 36.62°-15.45°$

| No. | R | D | $N_d$ | $\nu_d$ |
|---|---|---|---|---|
| 1 | −40.971 | 1.00 | 1.80440 | 40.9 |
| 2 | 28.739 | 1.00 | | |
| 3* | 24.739 | 1.50 | 1.58300 | 30.0 |
| 4 | 24.806 | 1.20 | | |
| 5 | 27.668 | 4.00 | 1.64769 | 33.8 |
| 6 | −850.013 | variable | | |
| 7 | 17.423 | 3.00 | 1.65844 | 50.9 |
| 8 | 214.353 | 1.50 | | |
| 9 | −27.090 | 1.20 | 1.49200 | 57.0 |
| 10* | −54.139 | 0.60 | | |
| 11 | 177.605 | 1.20 | 1.78472 | 25.7 |
| 12 | 22.837 | 6.00 | 1.51633 | 64.1 |
| 13 | −16.001 | variable | | |
| 14 | 62.802 | 3.50 | 1.60342 | 38.0 |
| 15 | −21.661 | 0.50 | | |
| 16 | −29.531 | 1.00 | 1.77250 | 49.6 |
| 17 | 1253.265 | 4.50 | | |
| 18 | −13.368 | 1.00 | 1.77250 | 49.6 |
| 19 | 249.360 | | | |

| f | $D_6$ | $D_{13}$ | $F_B$ |
|---|---|---|---|
| 29.10 | 9.87 | 9.33 | 9.97 |
| 47.99 | 5.28 | 4.78 | 25.46 |
| 78.25 | 0.60 | 2.50 | 47.03 |

| 5th surface aspherical coefficient | 10th surface aspherical coefficient |
|---|---|
| K = 0.689371 | K = −43.5404 |
| $A_1 = -4.55840 \times 10^{-6}$ | $A_1 = 6.76200 \times 10^{-5}$ |
| $A_2 = -3.06883 \times 10^{-8}$ | $A_2 = 3.10836 \times 10^{-7}$ |
| $|f_3|/Y_M = 1.05$ | $(e_{1w} - e_{1T})/(e_{2w} - e_{2T}) = 1.36$ |
| $n_{2p} = 1.59$ | $\nu_{2p} = 57.5$ |

Third example

-continued f = 29.11–78.25  F = 3.28–7.49  ω = 36.61°–15.45°

| No. | R | D | $N_d$ | $\nu_d$ |
|---|---|---|---|---|
| 1 | −41.868 | 1.30 | 1.80610 | 40.9 |
| 2 | 18.403 | 1.31 | | |
| 3 | 21.800 | 4.80 | 1.71736 | 29.5 |
| 4 | −122.850 | variable | | |
| 5 | 18.262 | 2.50 | 1.65844 | 50.9 |
| 6 | 45.978 | 1.32 | | |
| 7 | 38.608 | 1.20 | 1.49200 | 57.0 |
| 8* | 817.758 | 0.50 | | |
| 9 | 100.341 | 1.00 | 1.72825 | 28.5 |
| 10 | 14.183 | 6.00 | 1.48749 | 70.2 |
| 11 | −18.002 | variable | | |
| 12* | −85.035 | 1.20 | 1.49200 | 57.0 |
| 13 | −244.964 | 2.64 | | |
| 14 | −491.355 | 4.00 | 1.76182 | 26.6 |
| 15 | −27.053 | 2.92 | | |
| 16 | −12.273 | 1.20 | 1.77250 | 49.6 |
| 17 | 106.435 | | | |

| f | $D_6$ | $D_{13}$ | $F_B$ |
|---|---|---|---|
| 29.11 | 13.43 | 8.56 | 10.76 |
| 47.00 | 6.42 | 5.24 | 25.01 |
| 78.25 | 0.60 | 3.50 | 45.05 |

| 8th surface aspherical coefficient | 12th surface aspherical coefficient |
|---|---|
| K = −0.973573 | K = 1.38310 |
| $A_1 = 7.39608 \times 10^{-5}$ | $A_1 = 4.79295 \times 10^{-5}$ |
| $A_2 = 2.07611 \times 10^{-7}$ | $A_2 = 3.54289 \times 10^{-7}$ |

$|f_3|/Y_M = 1.05$  $(e_{1w}-e_{1T})/(e_{2w}-e_{2T}) = 2.53$
$n_{2p} = 1.55$  $\nu_{2p} = 59.4$

Fourth example f = 35.99–87.23  F = 3.69–8.00  ω = 31.00°–13.93°

| No. | R | D | $N_d$ | $\nu_d$ |
|---|---|---|---|---|
| 1 | −49.649 | 1.00 | 1.77250 | 49.6 |
| 2 | 164.447 | 0.20 | | |
| 3 | 29.342 | 1.00 | 1.80610 | 40.9 |
| 4 | 15.550 | 1.73 | | |
| 5 | 18.512 | 5.00 | 1.71736 | 29.5 |
| 6 | 42.005 | variable | | |
| 7 | 26.650 | 3.50 | 1.69680 | 55.5 |
| 8 | 826.088 | 0.30 | | |
| 9 | 27.985 | 1.50 | 1.49200 | 57.0 |
| 10* | 41.512 | 1.00 | | |
| 11 | 75.464 | 1.97 | 1.72825 | 28.5 |
| 12 | 15.039 | 6.69 | 1.51633 | 64.1 |
| 13 | −20.141 | variable | | |
| 14* | −40.127 | 1.50 | 1.49200 | 57.0 |
| 15 | −54.365 | 1.00 | | |
| 16 | −308.138 | 5.50 | 1.76182 | 26.6 |
| 17 | −31.543 | 3.40 | | |
| 18 | −11.965 | 1.20 | 1.77250 | 49.6 |
| 19 | −272.722 | | | |

| f | $D_6$ | $D_{13}$ | $F_B$ |
|---|---|---|---|
| 35.99 | 8.76 | 8.65 | 12.90 |
| 56.00 | 4.36 | 5.26 | 27.83 |
| 87.23 | 0.60 | 3.20 | 49.18 |

| 10th surface aspherical coefficient | 14th surface aspherical coefficient |
|---|---|
| K = 3.24822 | K = 8.74955 |
| $A_1 = 3.64966 \times 10^{-5}$ | $A_1 = 7.09209 \times 10^{-5}$ |
| $A_2 = 2.19988 \times 10^{-7}$ | $A_2 = 4.32173 \times 10^{-7}$ |

$|f_3|/Y_M = 1.15$  $(e_{1w}-e_{1T})/(e_{2w}-e_{2T}) = 1.50$
$n_{2p} = 1.57$  $\nu_{2p} = 58.9$

Fifth example f = 29.08–68.22  F = 3.28–6.84  ω = 36.64°–17.59°

| No. | R | D | $N_d$ | $\nu_d$ |
|---|---|---|---|---|
| 1 | −52.067 | 1.00 | 1.77250 | 49.6 |
| 2 | 54.493 | 0.20 | | |
| 3 | 28.512 | 1.00 | 1.80610 | 40.9 |
| 4 | 15.399 | 2.05 | | |
| 5 | 19.494 | 5.00 | 1.67270 | 32.1 |
| 6 | 100.245 | variable | | |
| 7 | 21.667 | 3.50 | 1.51633 | 64.1 |
| 8 | −114.373 | 0.30 | | |
| 9 | 27.197 | 1.50 | 1.49200 | 57.0 |
| 10* | 32.606 | 1.00 | | |
| 11 | 73.592 | 1.93 | 1.72825 | 28.5 |
| 12 | 15.834 | 6.62 | 1.51633 | 64.1 |
| 13 | −18.405 | variable | | |
| 14* | −34.369 | 1.50 | 1.49200 | 57.0 |
| 15 | −38.834 | 1.00 | | |
| 16 | −477.751 | 5.50 | 1.76182 | 26.6 |
| 17 | −34.486 | 3.40 | | |
| 18 | −11.326 | 1.20 | 1.80400 | 46.6 |
| 19 | −4438.286 | | | |

| f | $D_6$ | $D_{13}$ | $F_B$ |
|---|---|---|---|
| 29.08 | 9.38 | 7.70 | 9.64 |
| 44.41 | 4.93 | 4.78 | 21.11 |
| 68.23 | 0.60 | 3.20 | 36.65 |

| 10th surface aspherical coefficient | 14th surface aspherical coefficient |
|---|---|
| K = 8.14291 | K = −0.469015 |
| $A_1 = 3.56765 \times 10^{-5}$ | $A_1 = 5.85236 \times 10^{-5}$ |
| $A_2 = 2.18286 \times 10^{-7}$ | $A_2 = 4.36953 \times 10^{-7}$ |

$|f_3|/Y_M = 0.96$  $(e_{1w}-e_{1T})/(e_{2w}-e_{2T}) = 1.95$
$n_{2p} = 1.51$  $\nu_{2p} = 61.7$

In the sixth to eighth examples, the first lens unit comprises a biconcave negative lens, a negative meniscus lens having a convex surface directed at the object side and a positive lens, and the refractive index of the negative lens is 1.75 or more in order to decrease the absolute value of the Petzval's sum having a negative value. The second lens unit comprises a positive lens, an aspherical lens made of plastic, and a positive lens having a negative lens and a positive lens cemented, and the average value of the refractive index of the positive lens in the second lens unit is less than 1.65 in order to decrease the absolute value of the Petzval's sum.

As the coefficient of an aspherical surface, the fourth and sixth coefficients of height H from an optical axis are used. A surface is formed such that the larger Y the greater the negative refracting power to correct the spherical aberrations. A variation of curvature of field caused by the variable power as by-action is also small.

Since the aspherical lens is made of polymethylmetacrylate, processing cost as well as material cost are low, which is excellent in terms of cost. The third lens unit comprises an aspherical lens made of plastic, a positive lens and a negative lens having a concave surface having a small radius of curvature directed at the object side. Since the magnification chromatic aberration which increases on the longest focal length side is corrected, the Abbe's number of the negative lens is 45 or more, and that of the positive lens is less than 30. The aspherical surface of the third lens is formed so that the larger Y the greater the positive refracting power in order to prevent the aspherical aberration on the longest focal length side from being surplus correction, thus satisfactorily correcting the spherical aberration at the whole variable power area.

In the ninth example, the first lens unit comprises two lenses, biconcave negative lens and a positive lens, and the second lens unit comprises, from an object side, two positive lenses, and a positive lens having a negative lens and a positive lens cemented, the second positive lens from the object side being an aspherical surface. The refractive index of the aspherical lens is less than 1.6 so as not to make the processing accuracy severe.

Third lens unit has the same structure as that of the sixth to eighth examples.

Sixth example

-continued

| | f = 29.06-78.21 | F = 3.25-7.73 | ω = 36.66°-15.46° | |
|---|---|---|---|---|
| No. | R | D | $N_d$ | $\nu_d$ |
| 1 | −45.277 | 1.00 | 1.77250 | 49.6 |
| 2 | 80.470 | 0.20 | | |
| 3 | 31.031 | 1.00 | 1.80610 | 40.9 |
| 4 | 15.493 | 1.50 | | |
| 5 | 18.361 | 5.00 | 1.67270 | 32.1 |
| 6 | 97.232 | variable | | |
| 7 | 23.297 | 3.50 | 1.58913 | 61.2 |
| 8 | −216.174 | 0.30 | | |
| 9 | 26.423 | 1.50 | 1.49200 | 57.0 |
| 10* | 31.460 | 1.00 | | |
| 11 | 80.610 | 1.20 | 1.72825 | 28.5 |
| 12 | 15.648 | 7.00 | 1.51633 | 64.1 |
| 13 | −19.760 | variable | | |
| 14* | −34.314 | 1.50 | 1.49200 | 57.0 |
| 15 | −38.206 | 1.26 | | |
| 16 | −1109.687 | 5.00 | 1.76182 | 26.6 |
| 17 | −36.272 | 3.40 | | |
| 18 | −11.768 | 1.20 | 1.77250 | 49.6 |
| 19 | 851.804 | | | |

| f | $D_6$ | $D_{13}$ |
|---|---|---|
| 29.06 | 10.08 | 9.83 |
| 48.01 | 4.89 | 5.60 |
| 78.21 | 0.60 | 3.20 |

| 10th surface aspherical coefficient | 14th surface aspherical coefficient |
|---|---|
| K = 5.86073 | K = 1.89614 |
| $A_1 = 3.01532 \times 10^{-5}$ | $A_1 = 5.96754 \times 10^{-5}$ |
| $A_2 = 2.26674 \times 10^{-7}$ | $A_2 = 4.36089 \times 10^{-7}$ |

Seventh example

| | f = 29.06-78.24 | F = 3.26-7.73 | ω = 36.66°-15.45° | |
|---|---|---|---|---|
| No. | R | D | $N_d$ | $\nu_d$ |
| 1 | −53.003 | 1.00 | 1.77250 | 49.6 |
| 2 | 55.097 | 0.20 | | |
| 3 | 28.754 | 1.00 | 1.80610 | 40.9 |
| 4 | 15.468 | 1.86 | | |
| 5 | 19.039 | 5.00 | 1.67270 | 32.1 |
| 6 | 111.927 | variable | | |
| 7 | 21.925 | 3.50 | 1.51633 | 64.1 |
| 8 | −124.298 | 0.30 | | |
| 9 | 27.197 | 1.50 | 1.49200 | 57.0 |
| 10* | 32.606 | 1.00 | | |
| 11 | 90.111 | 1.58 | 1.80518 | 25.4 |
| 12 | 19.390 | 6.57 | 1.51823 | 59.0 |
| 13 | −19.137 | variable | | |
| 14* | −34.537 | 1.50 | 1.49200 | 57.0 |
| 15 | −37.893 | 1.00 | | |
| 16 | −499.664 | 5.50 | 1.72825 | 28.5 |
| 17 | −33.715 | 3.40 | | |
| 18 | −11.741 | 1.20 | 1.74100 | 52.7 |
| 19 | 230.627 | | | |

| f | $D_6$ | $D_{13}$ |
|---|---|---|
| 29.06 | 10.43 | 9.75 |
| 48.02 | 5.17 | 5.51 |
| 78.24 | 0.60 | 3.20 |

| 10th surface aspherical coefficient | 14th surface aspherical coefficient |
|---|---|
| K = 7.54213 | K = 4.28313 |
| $A_1 = 3.15571 \times 10^{-5}$ | $A_1 = 6.18115 \times 10^{-5}$ |
| $A_2 = 2.18836 \times 10^{-7}$ | $A_2 = 4.35094 \times 10^{-7}$ |

Eighth example

| | f = 29.11-78.23 | F = 3.28-7.65 | ω = 36.62°-15.46° | |
|---|---|---|---|---|
| No. | R | D | $N_d$ | $\nu_d$ |
| 1 | −51.613 | 1.00 | 1.78590 | 44.2 |
| 2 | 66.558 | 0.50 | | |
| 3 | 32.120 | 1.00 | 1.78590 | 44.2 |
| 4 | 16.301 | 1.50 | | |
| 5 | 19.591 | 4.40 | 1.74000 | 28.3 |
| 6 | 76.239 | variable | | |
| 7 | 22.814 | 2.50 | 1.72000 | 50.2 |
| 8 | 82.056 | 1.00 | | |
| 9 | 32.032 | 1.50 | 1.49200 | 57.0 |
| 10* | 164.670 | 1.00 | | |
| 11 | 153.311 | 1.20 | 1.72825 | 28.5 |
| 12 | 13.080 | 7.50 | 1.51633 | 64.1 |
| 13 | −17.476 | variable | | |
| 14* | −26.859 | 1.50 | 1.49200 | 57.0 |
| 15 | −31.152 | 0.80 | | |
| 16 | 141.259 | 5.00 | 1.84666 | 25.4 |
| 17 | −49.300 | 3.19 | | |
| 18 | −12.017 | 1.20 | 1.77250 | 49.6 |
| 19 | 161.942 | | | |

| f | $D_6$ | $D_{13}$ |
|---|---|---|
| 29.11 | 11.49 | 9.11 |
| 48.00 | 6.33 | 4.92 |
| 78.23 | 0.60 | 3.20 |

| 10th surface aspherical coefficient | 14th surface aspherical coefficient |
|---|---|
| $K = -9.22910 \times 10^{-2}$ | K = −0.927832 |
| $A_1 = 6.04108 \times 10^{-5}$ | $A_1 = 5.82285 \times 10^{-5}$ |
| $A_2 = 2.56893 \times 10^{-7}$ | $A_2 = 4.62679 \times 10^{-7}$ |

Ninth example

| | f = 36.01-87.27 | F = 3.67-8.00 | ω = 30.99°-13.92° | |
|---|---|---|---|---|
| No. | R | D | $N_d$ | $\nu_d$ |
| 1 | −35.351 | 1.00 | 1.81600 | 46.6 |
| 2 | 59.807 | 1.51 | | |
| 3 | 37.006 | 2.50 | 1.71736 | 29.5 |
| 4 | 214.845 | variable | | |
| 5 | 39.443 | 2.50 | 1.62374 | 47.1 |
| 6 | −492.717 | 0.30 | | |
| 7 | 21.979 | 3.00 | 1.54072 | 47.2 |
| 8* | −124.547 | 1.00 | | |
| 9 | −59.378 | 0.80 | 1.72825 | 28.5 |
| 10 | 21.589 | 7.78 | 1.51633 | 64.1 |
| 11 | −20.126 | variable | | |
| 12* | −57.175 | 1.50 | 1.49200 | 57.0 |
| 13 | −63.605 | 1.00 | | |
| 14 | 182.052 | 4.00 | 1.76182 | 26.6 |
| 15 | −58.394 | 3.80 | | |
| 16 | −11.508 | 1.20 | 1.74100 | 52.7 |
| 17 | −197.441 | | | |

| f | $D_6$ | $D_{13}$ |
|---|---|---|
| 36.01 | 8.72 | 9.33 |
| 56.00 | 3.86 | 5.85 |
| 87.27 | 0.60 | 3.20 |

| 8th surface aspherical coefficient | 12th surface aspherical coefficient |
|---|---|
| K = 6.33917 | K = −10.0555 |
| $A_1 = 4.16499 \times 10^{-5}$ | $A_1 = 3.20941 \times 10^{-5}$ |
| $A_2 = 1.40912 \times 10^{-7}$ | $A_2 = 4.29281 \times 10^{-7}$ |

Tenth example

| | f = 29.07-78.17 | F = 3.22-7.77 | ω = 36.45°-15.17° | |
|---|---|---|---|---|
| No. | R | D | $N_d$ | $\nu_d$ |
| 1 | −41.306 | 0.80 | 1.77250 | 49.6 |
| 2 | 214.733 | 0.50 | | |
| 3 | 26.064 | 1.00 | 1.78590 | 44.2 |
| 4 | 13.868 | 2.50 | | |
| 5 | 18.342 | 3.60 | 1.68893 | 31.1 |
| 6 | 52.587 | variable | | |
| 7 | 27.813 | 2.50 | 1.51633 | 64.1 |
| 8 | 192.426 | 0.20 | | |
| 9 | 17.114 | 2.21 | 1.80518 | 25.4 |
| 10 | 9.217 | 4.00 | 1.51823 | 59.0 |
| 11 | −38.755 | 0.80 | | |
| 12 | −16.492 | 2.00 | 1.49200 | 57.0 |
| 13* | −13.484 | variable | | |
| 14 | −31.825 | 2.50 | 1.49200 | 57.0 |
| 15* | −35.627 | 0.20 | | |
| 16 | −26.118 | 2.50 | 1.72825 | 28.5 |
| 17 | −15.199 | 4.29 | | |
| 18 | −10.943 | 1.20 | 1.77250 | 49.6 |
| 19 | −258.791 | | | |

| f | $D_6$ | $D_{13}$ |
|---|---|---|
| 29.07 | 9.60 | 10.50 |
| 48.00 | 5.06 | 6.24 |
| 78.17 | 1.60 | 3.60 |

| 13th surface aspherical coefficient | 15th surface aspherical coefficient |
|---|---|

-continued

| | |
|---|---|
| K = 4.80830 × 10$^{-2}$ | K = 9.14536 |
| A$_1$ = 4.73156 × 10$^{-5}$ | A$_1$ = 8.20679 × 10$^{-6}$ |
| A$_2$ = 9.53306 × 10$^{-8}$ | A$_2$ = 1.23820 × 10$^{-7}$ |

In the following, examples of the focussing method according to the present invention will be described. As an example, the extension amount of focussing with respect to an object with a distance between images being 1 m and aberrations therefor will be shown.

In the 11the example, the extension is made so as to have the relation of $D_{ab}/D_1=0.5$. In case of 1m, $D_{ab}=0.66$ mm and $D_1=1.31$ mm. The moving amount of the 1-a lens component is 1.97 mm, and the moving amount of the 1-b lens component is 1.31 mm. On the other hand, when the first lens unit as a whole is extended, it is necessary to move it by 2.4 mm, and in the present invention, the moving amount is only 0.4 mm.

In the 12the example, the extension is made so as to have the relation of $D_{ab}=D_1=D_1=0.72$ mm. The moving mount of the 1-a lens component is 1.44 mm, and the moving amount of the 1-b lens component is 0.72 mm, which is less by 0.8 mm than the case where the first lens unit is extended as it is.

Figure 22A:
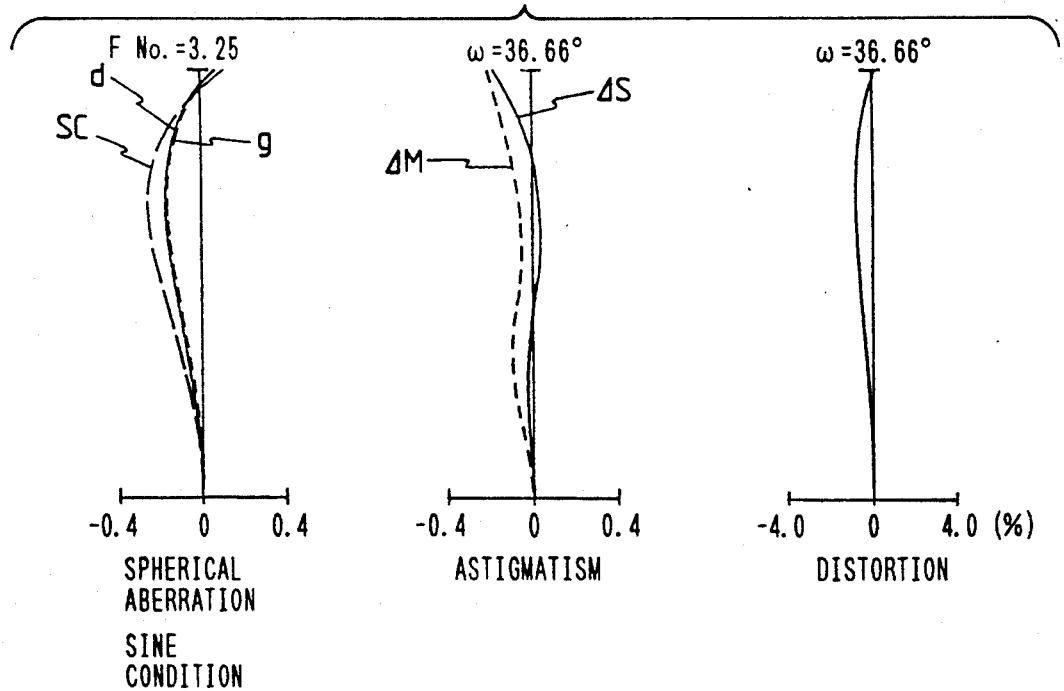
FIGS. 22A, 22B, 22C, 23A, 23B, 23C, 24A, 24B and 24C show aberrations of the eleventh example.
Figure 22B:
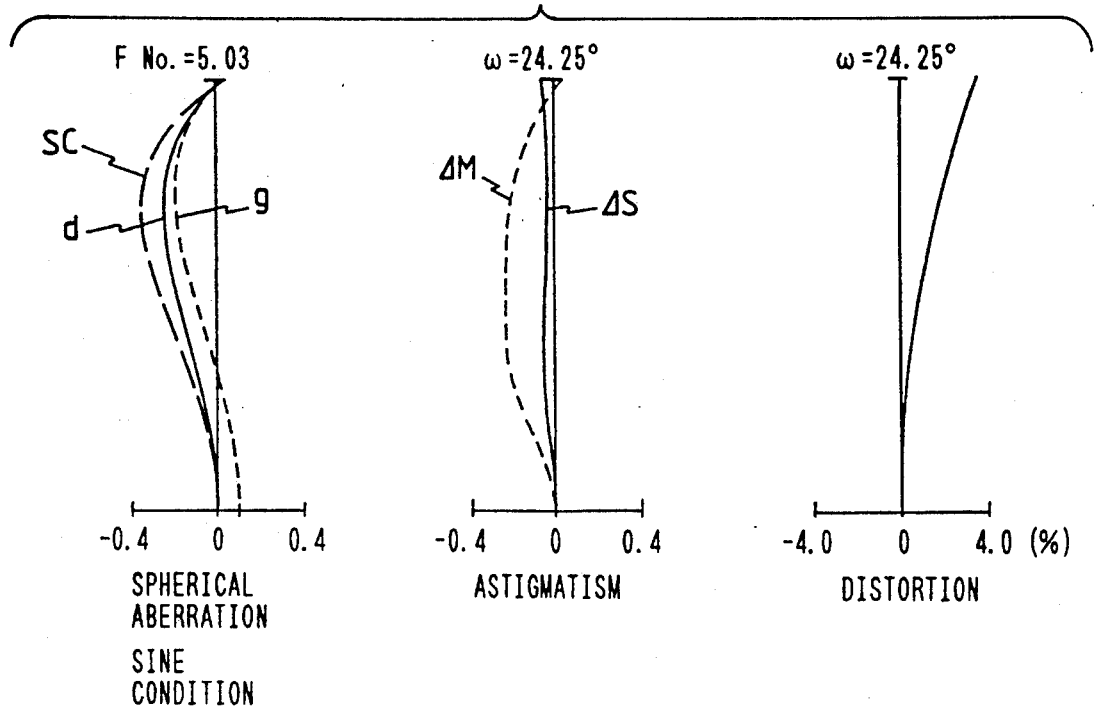
Figure 22C:
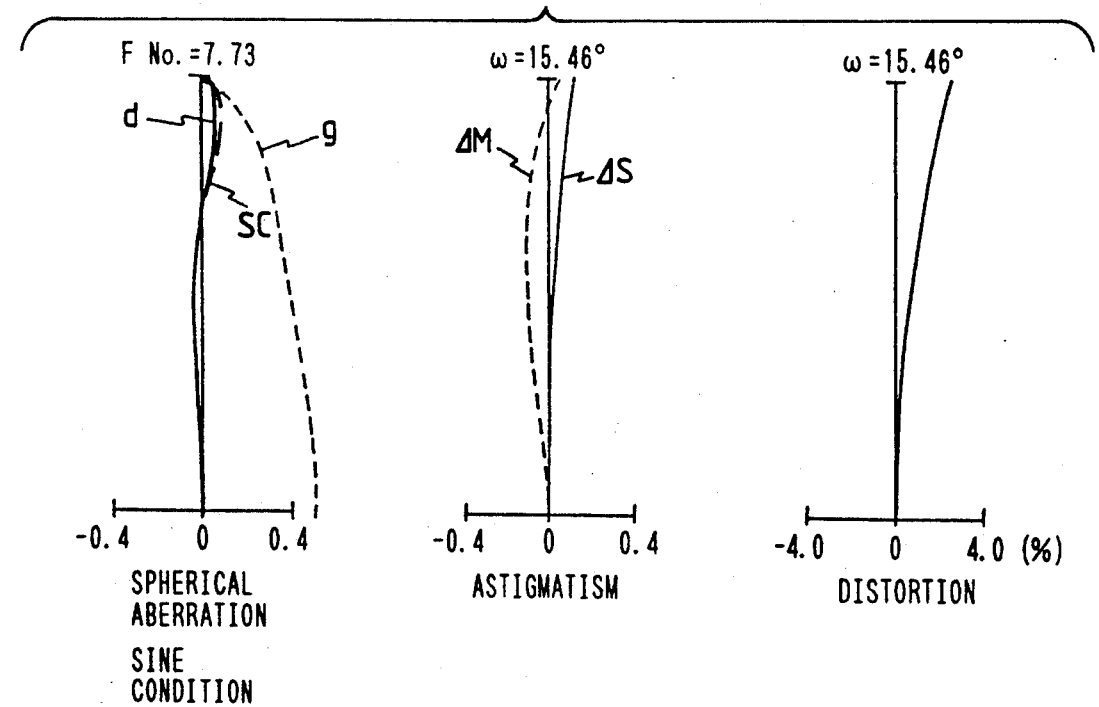
Figure 23A:
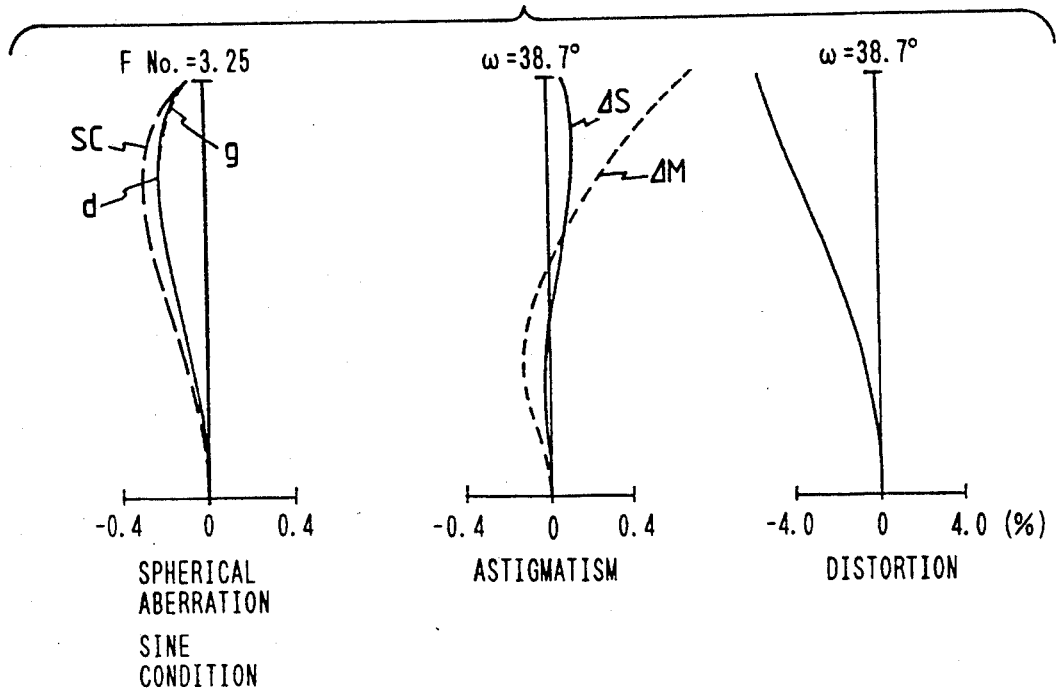
Figure 23B:
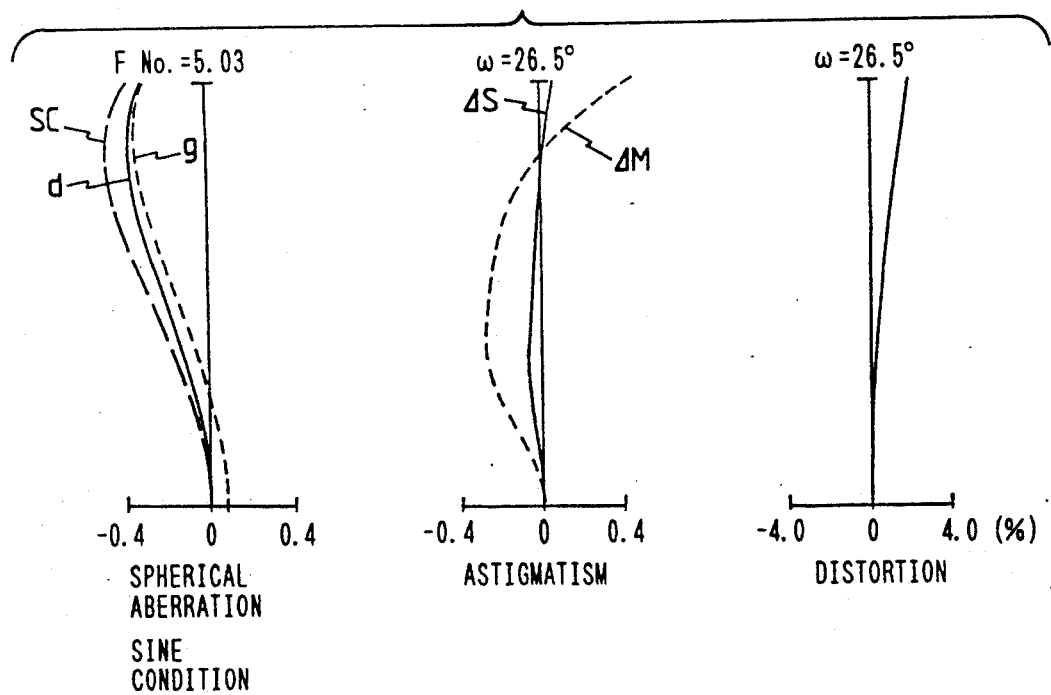
Figure 23C:
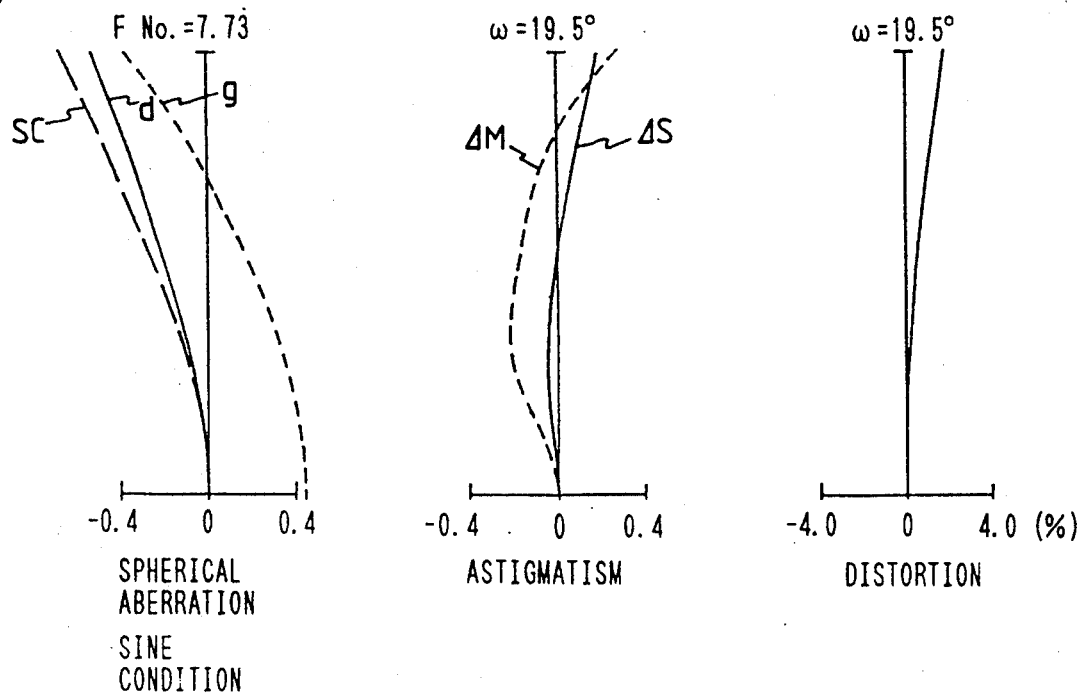
Figure 24A:
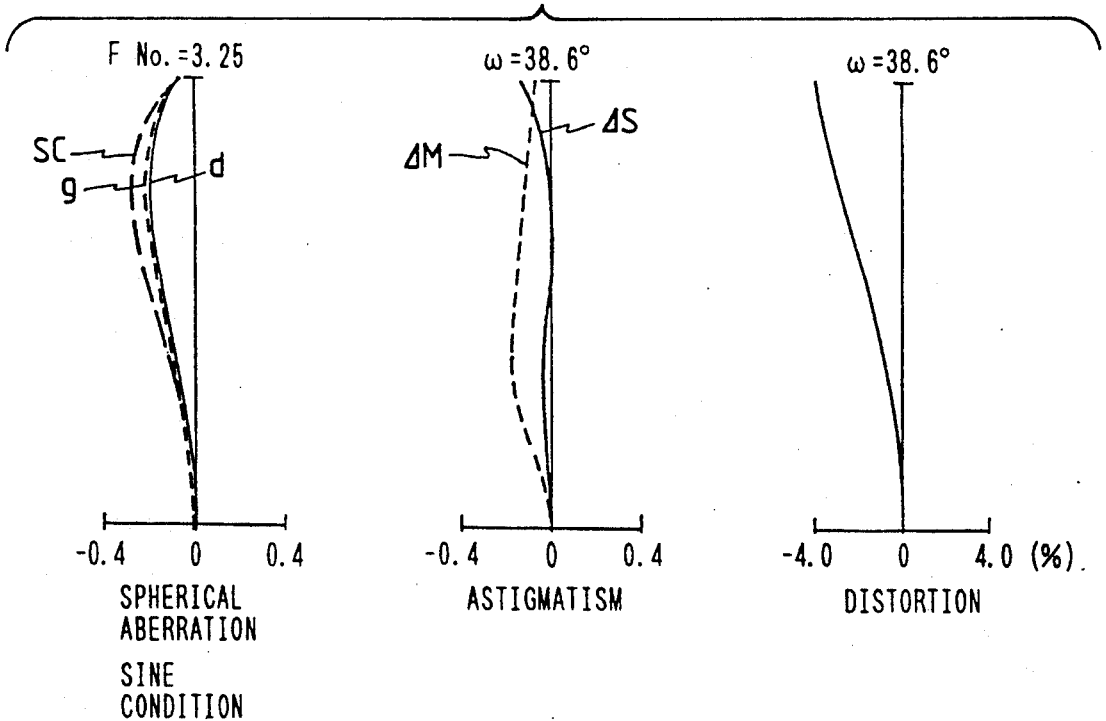
Figure 24B:
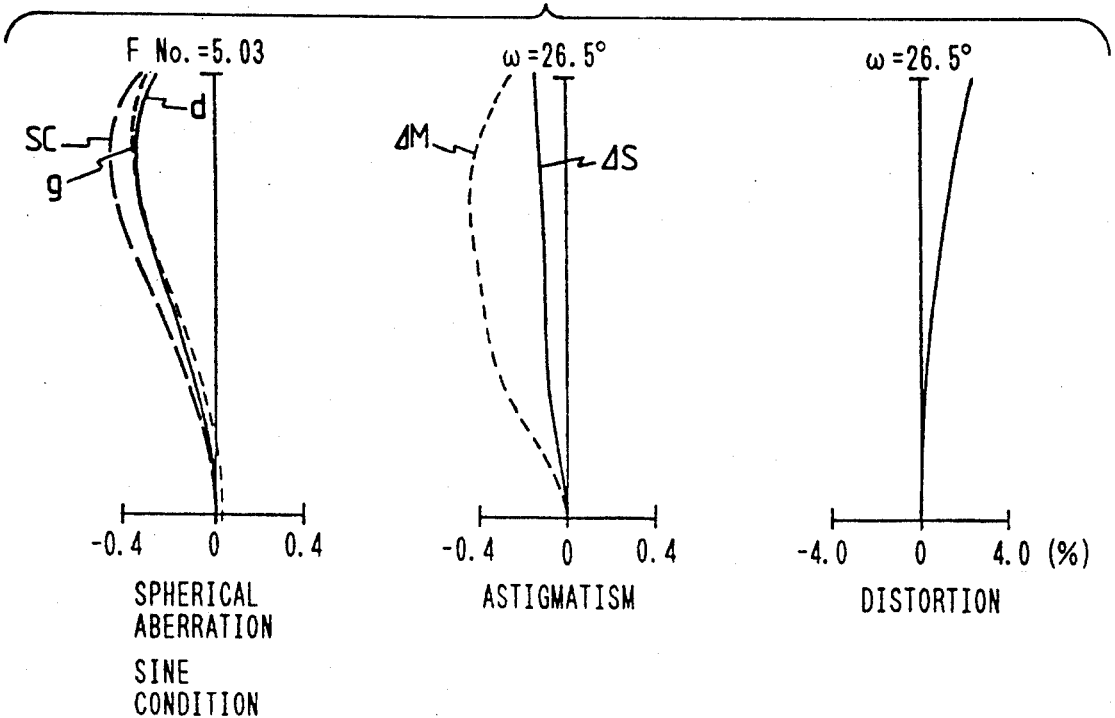
Figure 24C:
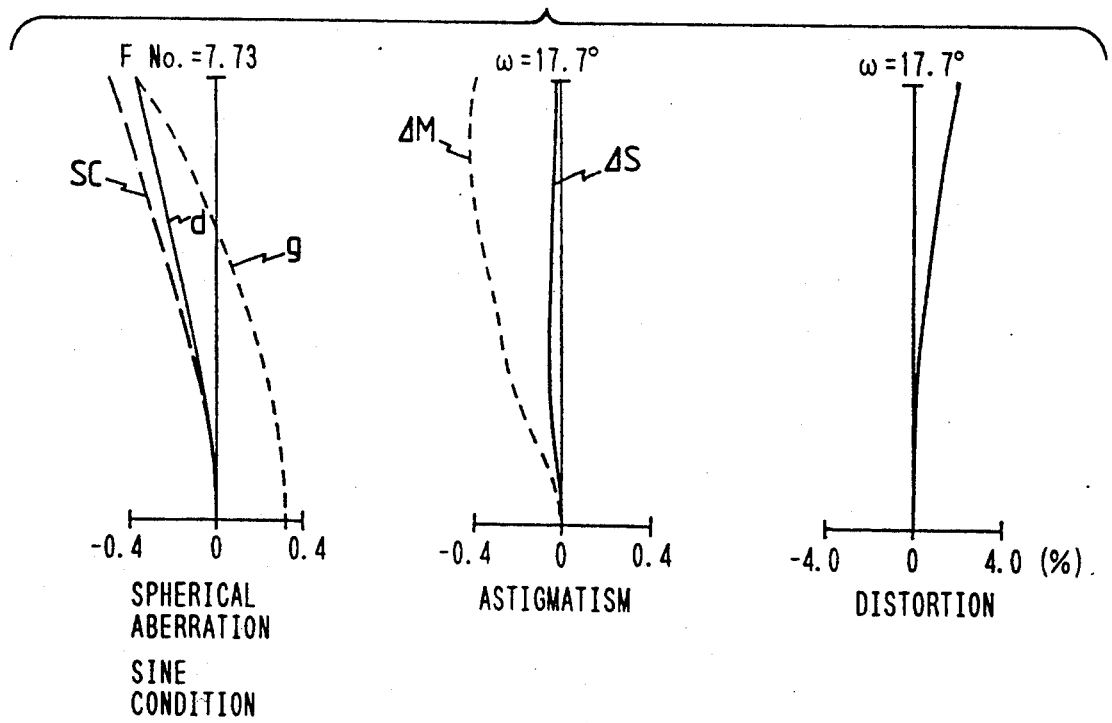
Figure 25:
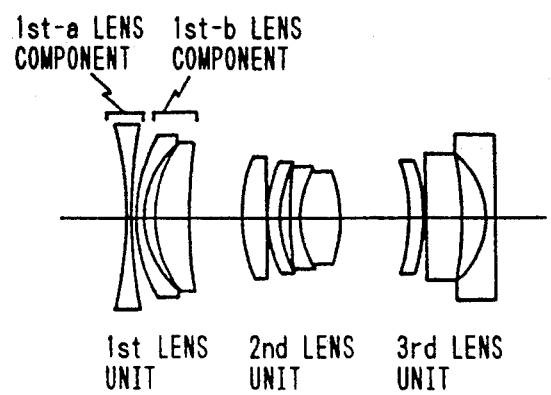
FIG. 25 is a sectional view of a twelfth example.
Figure 26A:
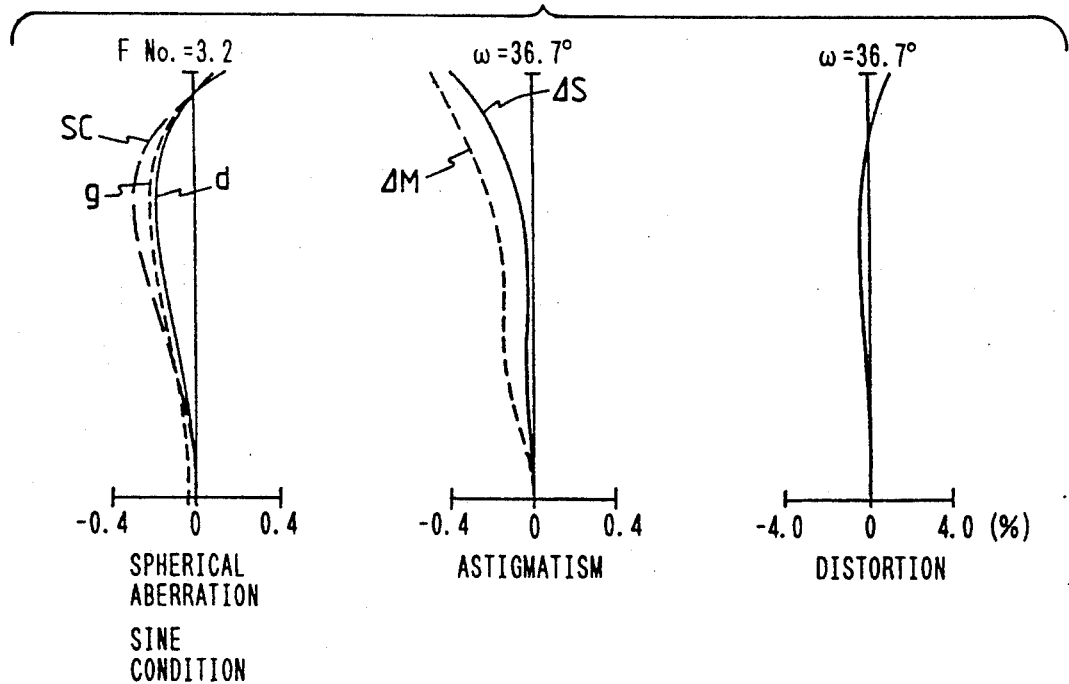
Figure 26B:
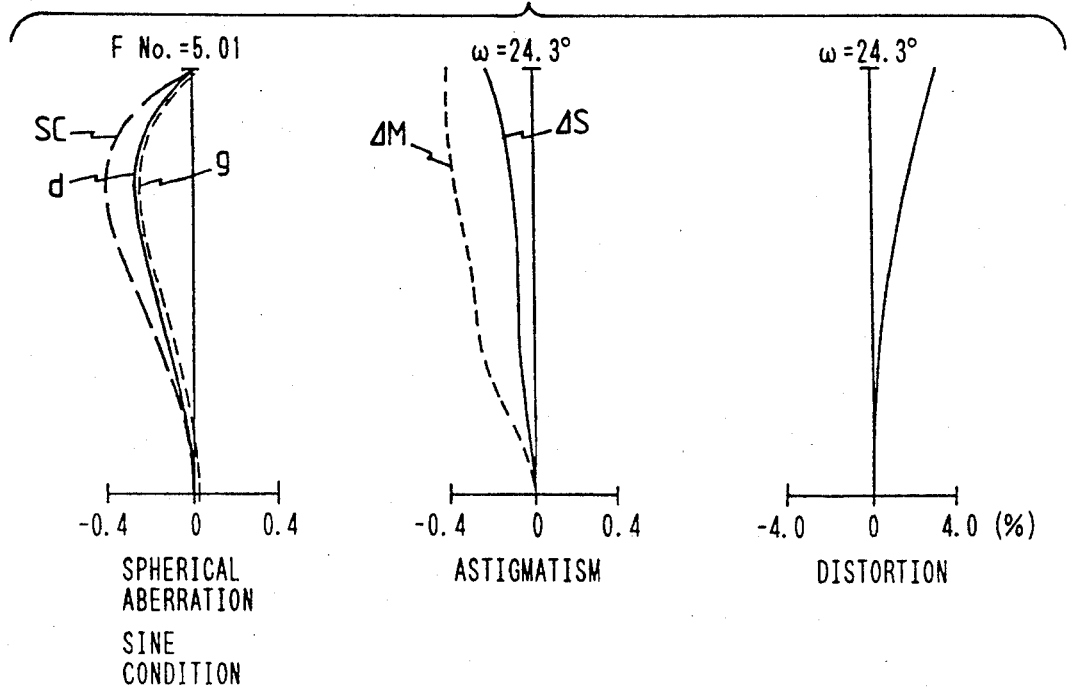
Figure 26C:
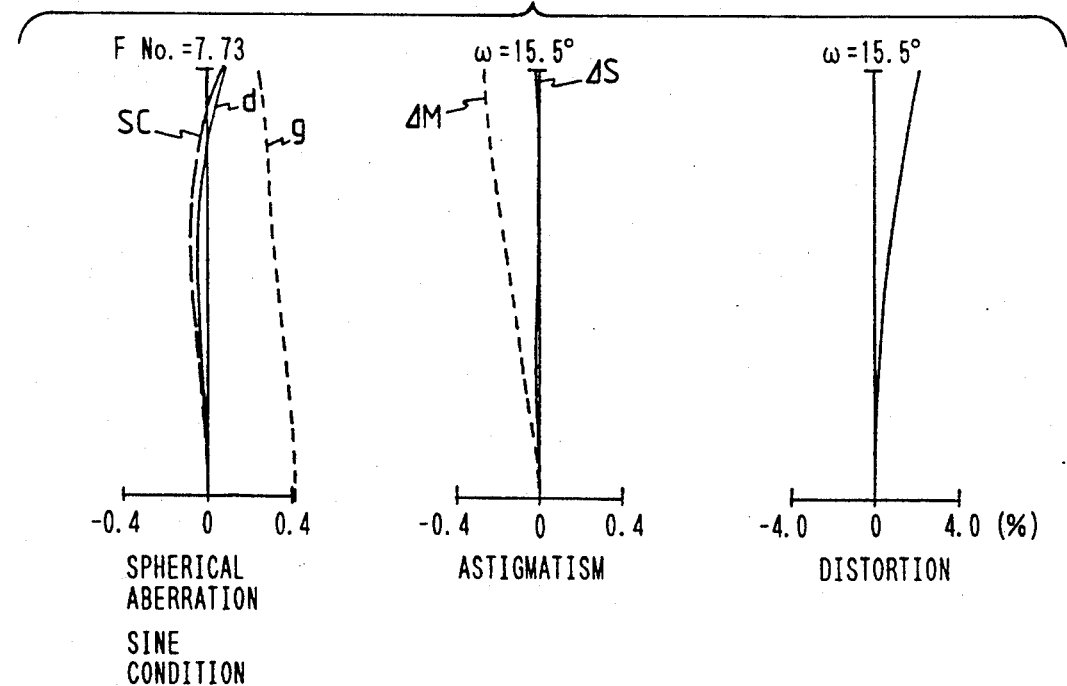
Figure 27A:
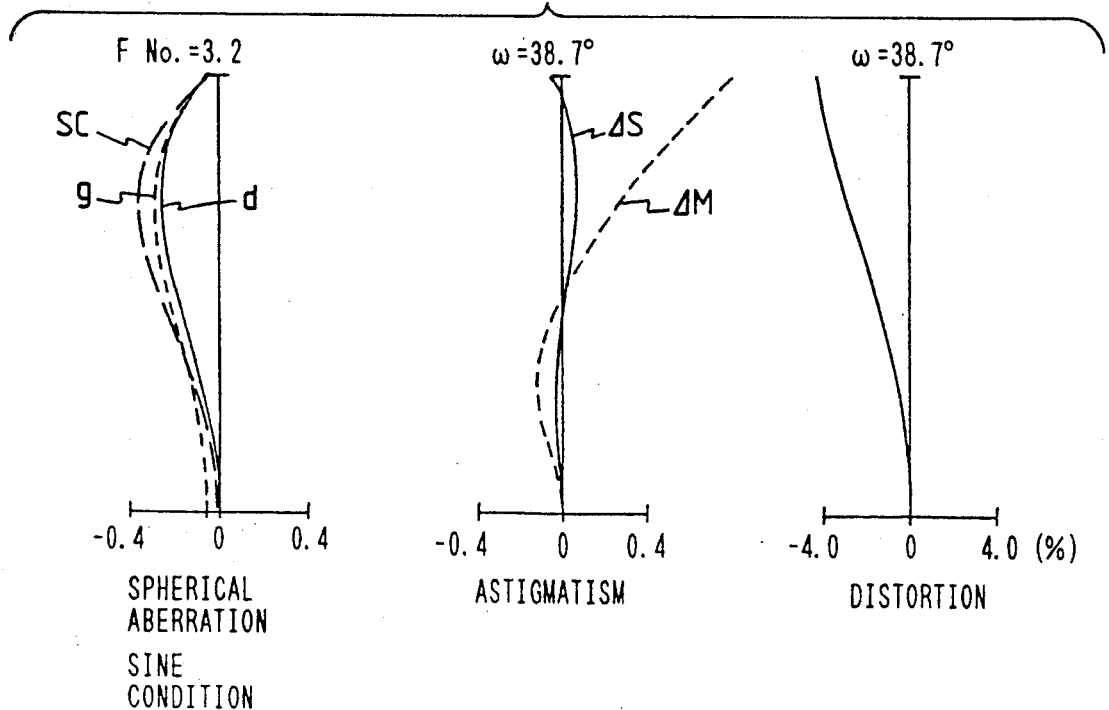
Figure 27B:
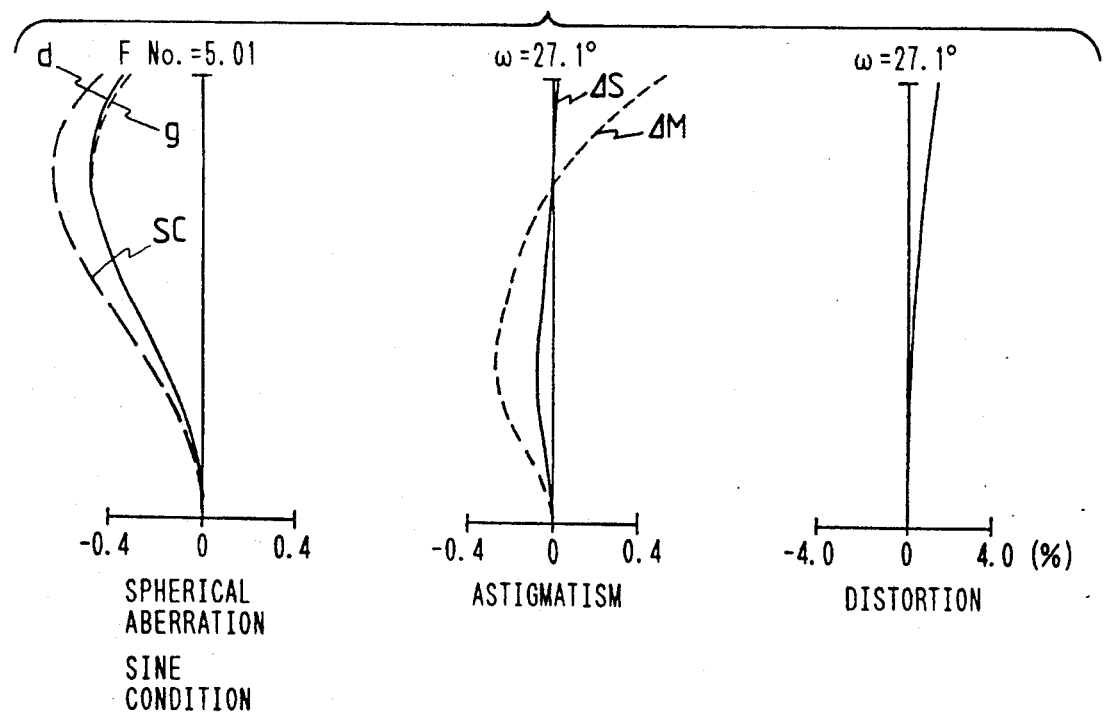
Figure 28B:
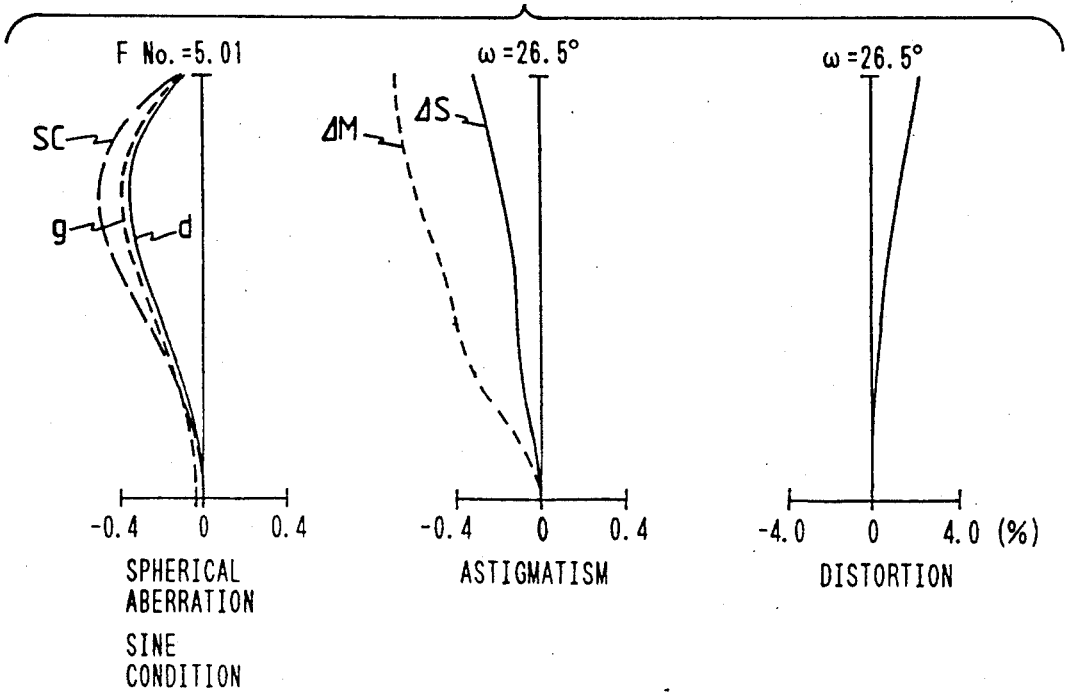
Figure 28C:
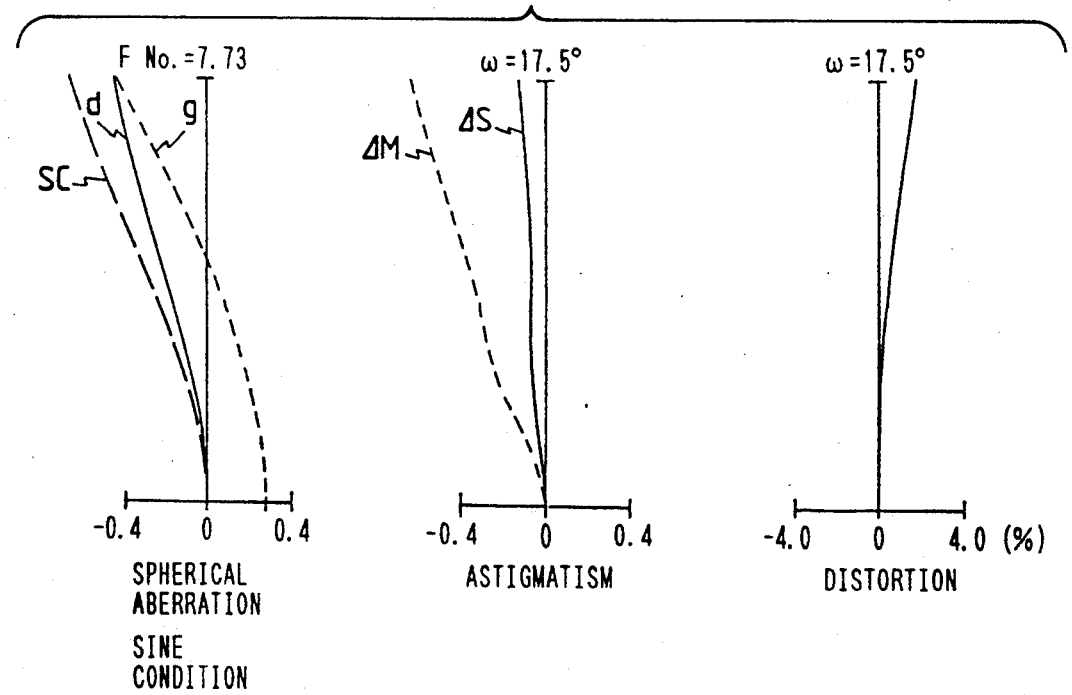

FIGS. 22, 23 and 24 show, in the 11the example, (a) an aberration with respect to an infinite far object, (b) an aberration when the first lens is extended as it is, and (c) an aberration when the first lens unit is extended while spreading the spacing between the 1-a lens component and the 1-b lens component. FIGS. 26, 27 and 28 show aberrations in case of the aforesaid (a), (b) and (c) with respect to the 12th example.

| Eleventh example |||||
|---|---|---|---|---|
| f = 29.06–78.21 | F = 3.25–7.73 | ω = 36.66°–15.46° | | |
| No. | | R | D | N$_d$ | ν$_d$ |

| No. | | | R | D | N$_d$ | ν$_d$ |
|---|---|---|---|---|---|---|
| 1 | ⎤ | 1st-a lens | −45.277 | 1.00 | 1.77250 | 49.6 |
| 2 | ⎦ | component | 80.470 | 0.20 | | |
| 3 | ⎤ | | 31.031 | 1.00 | 1.80610 | 40.9 |
| 4 | | 1st-b lens | 15.493 | 1.50 | | |
| 5 | | component | 18.361 | 5.00 | 1.67270 | 32.1 |
| 6 | ⎦ | | 97.232 | variable | | |
| 7 | ⎤ | | 23.297 | 3.50 | 1.58913 | 61.2 |
| 8 | | | −216.174 | 0.30 | | |
| 9 | | | 26.423 | 1.50 | 1.49200 | 57.0 |
| 10 | | 2nd lens | 31.460 | 1.00 | | |
| 11 | | unit | 80.610 | 1.20 | 1.72825 | 28.5 |
| 12 | | | 15.648 | 7.00 | 1.51633 | 64.1 |
| 13 | ⎦ | | −19.760 | variable | | |
| 14 | ⎤ | | −34.314 | 1.50 | 1.49200 | 57.0 |
| 15 | | | −38.206 | 1.26 | | |
| 16 | | 3rd lens | −1109.687 | 5.00 | 1.76182 | 26.6 |
| 17 | | unit | −36.272 | 3.40 | | |
| 18 | | | −11.768 | 1.20 | 1.77250 | 49.6 |
| 19 | ⎦ | | 851.804 | | | |

| F | D$_6$ | D$_{13}$ |
|---|---|---|
| 29.06 | 10.08 | 9.83 |
| 48.01 | 4.89 | 5.60 |
| 78.21 | 0.60 | 3.20 |

| 10th surface aspherical coefficient | 14th surface aspherical coefficient |
|---|---|
| K = 5.86073 | K = 1.89614 |
| A$_1$ = 3.01532 × 10$^{-5}$ | A$_1$ = 5.96754 × 10$^{-5}$ |
| A$_2$ = 2.26674 × 10$^{-7}$ | A$_2$ = 4.36089 × 10$^{-7}$ |

The extension amount with respect to the object distanced by 1 mm:
(1) In case of the integral extension of the first lens unit: 2.4 mm
(2) In case of the extension method according to the present invention:
Moving amount of the 1-a lens component: 1.97 mm
Moving amount of the 1-b lens component: 1.31 mm

| Twelfth example |||||
|---|---|---|---|---|
| f = 29.03–78.00 | F = 3.20–7.73 | ω = 36.69°–15.50° | | |

| No. | | | R | D | N$_d$ | ν$_d$ |
|---|---|---|---|---|---|---|
| 1 | ⎤ | 1st-a lens | −55.841 | 1.00 | 1.77250 | 49.6 |
| 2 | ⎦ | component | 71.021 | 0.90 | | |
| 3 | ⎤ | | 26.856 | 1.00 | 1.80610 | 40.9 |
| 4 | | 1st-b lens | 14.389 | 1.84 | | |
| 5 | | component | 17.921 | 5.00 | 1.67270 | 32.1 |
| 6 | ⎦ | | 63.437 | variable | | |
| 7 | ⎤ | | 24.325 | 3.50 | 1.51633 | 64.1 |
| 8 | | | −2890.511 | 0.30 | | |
| 9 | | | 22.000 | 2.00 | 1.49200 | 57.0 |
| 10 | | 2nd lens | 23.000 | 1.00 | | |
| 11 | | unit | 39.561 | 1.81 | 1.72825 | 28.5 |
| 12 | | | 13.827 | 6.11 | 1.51633 | 64.1 |
| 13 | ⎦ | | −18.502 | variable | | |
| 14 | ⎤ | | −26.000 | 2.00 | 1.49200 | 57.0 |
| 15 | | | −28.000 | 0.50 | | |
| 16 | | 3rd lens | −247.293 | 5.50 | 1.76182 | 26.6 |
| 17 | | unit | −36.325 | 3.80 | | |
| 18 | | | −11.996 | 1.20 | 1.77250 | 49.6 |
| 19 | ⎦ | | −3693.295 | | | |

| F | D$_6$ | D$_{13}$ |
|---|---|---|
| 29.03 | 8.60 | 10.27 |
| 48.00 | 4.48 | 5.66 |
| 78.00 | 0.60 | 3.20 |

| 10th surface aspherical coefficient | 14th surface aspherical coefficient |
|---|---|
| K = 2.18347 | K = 1.21531 |
| A$_1$ = 2.91183 × 10$^{-5}$ | A$_1$ = 6.68984 × 10$^{-5}$ |
| A$_2$ = 2.13663 × 10$^{-7}$ | A$_2$ = 4.38218 × 10$^{-7}$ |

The extension amount with respect to the object distanced by 1 m:
(1) In case of the integral extension of the first lens unit: 2.2 mm
(2) In case of the extension method according to the present invention:
Moving amount of the 1-a lens component: 1.44 mm
Moving amount of the 1-b lens component: 0.72 mm

What is claimed is:

1. A variable magnification zoom lens having three groups of lenses, comprising in order from an object side of the lens:

a first lens unit having a negative focal length;

a second lens unit spaced apart from said first lens unit and having a positive focal length; and a third lens unit spaced a part from said second lens unit and having a negative focal length:

wherein a first space between said first and second lens units and a second space between said second and third lens units are continuously reduced as said lens units a removed toward the object side from a shortest focal length end to a longest focal length end to vary the magnification of said zoom lens; and wherein if $f_3$ is the focal length of said third lens unit and if $Y_M$ is equal to half of a diagonal length of an image pane, then $(|f_3|/Y_M)$ is greater than 0.8 and less than 1.2.

2. A zoom lens according to claim 1, wherein if $e_{1w}$ and $e_{1T}$ respectively represent said first space at the shortest focal length and the longest focal length end, and wherein, when $e_{2w}$ and $e_{2T}$ respectively represent said second space at the shortest focal length end and the longest focal length end, then $(e_{1w}-e_{1T})/(e_{2w}-e_{2T})$ is greater than 1.2 and less than 3.0.

3. A zone lens according to claim 1, wherein:

said first lens unit comprises, one or more negative lenses and positive lenses;

said second lens unit comprises at least two positive lenses and at least one negative lens; and said third lens unit comprises at least one positive lens and at least one negative lens, and wherein if $n_{2p}$ represents an average value of a refractive index of the positive lenses in said second lens unit and if $\nu_{2p}$ represents an average value of Abbe's number, then:

$n_{2p}$ is smaller than 1.6 and $\nu_{2p}$ is greater than 55.

4. A zoom lens according to claim 3, wherein:

the first lens unit is movable toward said object side when focusing;

said first lens unit comprises a negative first-subgroup and a positive second sub-group including a positive lens, and wherein a distance between said first sub-group and said second sub-group varies during focusing; and wherein a first space between said first and second lens units and a second space between said second and third lens units are continuously reduced as said lens units are moved toward the object side from a shortest focal length end to a longest focal length end to vary the magnification of said zone lens; and wherein an aspherical surface is provided on at least one surface of said second lens unit and on at least one surface of said third lens units to form aspherical lenses, the refractive index of said aspherical lenses being less than 1.7.

5. A variable magnification zoom lens having three groups of lenses, comprising in order from an object side of the lens:

a first lens unit having a negative focal length;

a second lens unit spaced part from said first lens unit and having a positive focal length; and a third lens unit spaced apart from said second lens unit and having a negative focal length;

wherein a first space between said first and second lens units and a second space between said second and third lens units are continuously reduced as said lens units are moved toward the object side from a shortest focal length end to a longest focal length end to vary the magnification of said zoom lens; and wherein an aspherical surface is provided on at least one surface of said second lens unit and for at least one surface of said third lens unit to form aspherical lenses, the refractive index of said aspherical lenses being less than 1.7.

6. A zoom lens according to claim 5, wherein if $e_{1w}$ and $e_{1T}$ respectively represent said first space at the shortest focal length and the longest focal length end, and wherein, when $e_{2w}$ and $e_{2T}$ respectively represent said second space at the shortest focal length end and the longest focal length end, then $(e_{1w}e_{1T})/(e_{2w}-e_{2T})$ is greater than 1.2 and less than 3.0.

7. A zoom lens according to claim 5, wherein the shape of the aspherical surface of said second lens unit is formed so that a ray toward the lens margin is emanated, and wherein the shape of the aspherical surface of said third lens unit is formed so that a ray is condensed so that it is not emanated as it moves toward the margin of the lens.

8. A zoom lens comprising in order from an object side of the lens:

a negative first lens group movable towards said object when focusing:

a positive second lens group; and a negative third lens group;

wherein said first lens group comprises a negative first sub-group and a positive second sub-group including a positive lens, and a distance between said first sub-group and said second sub-group varies during focusing.

9. A zoom lens according to claim 8, wherein:

said first lens group has a negative refracting power;

said second lens group has a positive refracting power;

said third lens group has a negative refracting power; and said first lens unit comprises a biconcave lens.

10. A zoom lens according to claim 8, wherein second sub-group comprises a negative meniscus lens having a convex surface directed toward the object side.

11. A zoom lens according to claim 10, wherein said distance between said first sub-group and said second sub-group of said first lens unit expands during focusing.

12. A zoom lens according to claim 8, wherein, when $D_{ab}$ is a varying amount of a distance between said first sub-group and said second sub-group and wherein, when $D_1$ is a moving amount of the first lens group when focusing, then a relation $D_{ab}/D_1$ is maintained constant during a focusing with respect to an object in a plurality of focusing ranges.

* * * * *